(12) United States Patent
Leabman et al.

(10) Patent No.: US 9,882,395 B1
(45) Date of Patent: Jan. 30, 2018

(54) CLUSTER MANAGEMENT OF TRANSMITTERS IN A WIRELESS POWER TRANSMISSION SYSTEM

(71) Applicant: ENERGOUS CORPORATION, San Jose, CA (US)

(72) Inventors: Michael Leabman, San Ramon, CA (US); Douglas Bell, Pleasanton, CA (US); Michael Nelson, San Jose, CA (US)

( * ) Notice: Subject to any disclaimer, the term of this patent is extended or adjusted under 35 U.S.C. 154(b) by 0 days.

(21) Appl. No.: 14/748,136

(22) Filed: Jun. 23, 2015

Related U.S. Application Data

(63) Continuation of application No. 14/587,616, filed on Dec. 31, 2014, and a continuation-in-part of application No. 14/272,124, filed on May 7, 2014.

(51) Int. Cl.
*H02J 17/00* (2006.01)
*H02J 5/00* (2016.01)
(Continued)

(52) U.S. Cl.
CPC ............ *H02J 5/005* (2013.01); *H01F 38/14* (2013.01); *H02J 7/025* (2013.01); *H02J 50/20* (2016.02);
(Continued)

(58) Field of Classification Search
CPC .. H02J 17/00; H02J 50/00; H02J 50/20; H02J 50/40; H02J 50/80; H02J 50/90
See application file for complete search history.

(56) References Cited

U.S. PATENT DOCUMENTS 787,412 A 4/1905 Tesla
3,434,678 A 3/1969 Brown et al.
(Continued)

FOREIGN PATENT DOCUMENTS

CN 203826555 U 9/2014
CN 104090265 A 10/2014
(Continued)

OTHER PUBLICATIONS

International Search Report dated Sep. 12, 2014 corresponding to International Patent Application No. PCT/US2014/037072, 3 pages.
(Continued)

*Primary Examiner* — Fritz M Fleming
(74) *Attorney, Agent, or Firm* — Morgan, Lewis & Bockius LLP

(57) ABSTRACT

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. A wireless power network may include a plurality of wireless power transmitters each with an embedded wireless power transmitter manager, including a wireless power manager application. The wireless power network may include a plurality of client devices with wireless power receivers. Wireless power receivers may include a power receiver application configured to communicate with the wireless power manager application. The wireless power manager application may include a device database where information about the wireless power network may be stored.

17 Claims, 21 Drawing Sheets

(51) Int. Cl.
*H02J 7/02* (2016.01)
*H01F 38/14* (2006.01)
*H04B 5/00* (2006.01)
*H04W 4/00* (2009.01)
*H04L 5/22* (2006.01)
*H02J 50/20* (2016.01)
*H02J 50/40* (2016.01)

(52) U.S. Cl.
CPC ............ *H02J 50/40* (2016.02); *H04B 5/0037* (2013.01); *H04L 5/22* (2013.01); *H04W 4/008* (2013.01)

(56) References Cited

U.S. PATENT DOCUMENTS

| | | |
|---|---|---|
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B2 | 12/2003 | Mott et al. |
| 6,798,716 B1 | 9/2004 | Charych |
| 6,803,744 B1 | 10/2004 | Sabo |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,552,597 B2 | 10/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |

(56) References Cited

U.S. PATENT DOCUMENTS

| | | |
|---|---|---|
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 * | 7/2004 | Dayan ............... H02J 5/005 336/200 |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0116683 A1 | 6/2005 | Cheng |
| 2005/0117660 A1 | 6/2005 | Vialle et al. |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 * | 9/2006 | Greene ............... H02J 17/00 455/572 |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 * | 1/2007 | Keyes ............... H02J 17/00 455/522 |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 * | 8/2007 | Cook ............... H02J 17/00 455/572 |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0273486 A1 | 11/2007 | Shiotsu |
| 2007/0298846 A1 | 12/2007 | Greene et al. |
| 2008/0014897 A1 * | 1/2008 | Cook ............... H02J 17/00 455/343.1 |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0113816 A1 | 5/2008 | Mahaffey et al. |
| 2008/0122297 A1 * | 5/2008 | Arai ............... H02J 17/00 307/154 |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 * | 4/2009 | Porwal ............... H02J 17/00 307/104 |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |

(56) References Cited

U.S. PATENT DOCUMENTS

| | | |
|---|---|---|
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1* | 11/2009 | Wakamatsu ............ H02J 17/00 700/296 |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1* | 11/2009 | Toncich .................. H02J 17/00 455/41.1 |
| 2009/0291634 A1 | 11/2009 | Saarisalo |
| 2009/0299175 A1 | 12/2009 | Bernstein et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1* | 6/2010 | Zhu ........................ H02J 17/00 370/343 |
| 2010/0151808 A1 | 6/2010 | Toncich et al. |
| 2010/0156721 A1 | 6/2010 | Alamouti et al. |
| 2010/0164433 A1 | 7/2010 | Janefalkar et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0237709 A1 | 9/2010 | Hall et al. |
| 2010/0244576 A1 | 9/2010 | Hillan et al. |
| 2010/0256831 A1* | 10/2010 | Abramo ................. H02J 17/00 700/292 |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1* | 2/2011 | Baarman ................ H02J 17/00 320/108 |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2012/0013196 A1 | 1/2012 | Kim et al. |
| 2012/0013198 A1 | 1/2012 | Uramoto et al. |
| 2012/0013296 A1 | 1/2012 | Heydari et al. |

(56) References Cited

U.S. PATENT DOCUMENTS

| | | |
|---|---|---|
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056741 A1 | 3/2012 | Zhu et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1* | 4/2012 | Kang .............. H02J 7/025 320/108 |
| 2012/0099675 A1 | 4/2012 | Kitamura et al. |
| 2012/0103562 A1 | 5/2012 | Alexander |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | Deluca |
| 2012/0280650 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1* | 9/2013 | Huang .............. G06F 1/266 713/330 |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |

(56) References Cited

U.S. PATENT DOCUMENTS

| | | |
|---|---|---|
| 2014/0008992 A1 | 1/2014 | Leabman |
| 2014/0008993 A1 | 1/2014 | Leabman |
| 2014/0009108 A1 | 1/2014 | Leabman |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0049422 A1 | 2/2014 | Von Novak et al. |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0086125 A1 | 3/2014 | Polo et al. |
| 2014/0091756 A1 | 4/2014 | Ofstein et al. |
| 2014/0091968 A1 | 4/2014 | Harel et al. |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sankar |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0206384 A1 | 7/2014 | Kim et al. |
| 2014/0210281 A1 | 7/2014 | Ito et al. |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Urgovan et al. |
| 2015/0015180 A1 | 1/2015 | Miller et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0028688 A1 | 1/2015 | Masaoka |
| 2015/0028694 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Arai et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0222126 A1 | 8/2015 | Leabman et al. |
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |

(56) References Cited

U.S. PATENT DOCUMENTS

| | | |
|---|---|---|
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0085120 A1 | 3/2017 | Leabman et al. |
| 2017/0085437 A1 | 3/2017 | Condeixa et al. |
| 2017/0092115 A1 | 3/2017 | Sloo et al. |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110135540 A1 | 12/2011 |
| KR | 20111032059 A | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 03091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | 2010138994 A1 | 12/2010 |
| WO | WO 2010138994 A1 | 12/2010 |
| WO | 2011112022 A2 | 9/2011 |
| WO | WO 2011112022 A2 | 9/2011 |
| WO | WO 2012177283 A1 | 12/2012 |
| WO | 2013/031988 A1 | 3/2013 |
| WO | 2013035190 A1 | 3/2013 |
| WO | WO 2013042399 A1 | 3/2013 |
| WO | WO 2013052950 A1 | 4/2013 |
| WO | WO 2013105920 A2 | 7/2013 |
| WO | 2014075103 A1 | 5/2014 |
| WO | 2014132258 A1 | 9/2014 |
| WO | 2014182788 A2 | 11/2014 |
| WO | 2014182788 A3 | 11/2014 |
| WO | 2014197472 A1 | 12/2014 |
| WO | 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016048512 A1 | 3/2016 |
| WO | WO 2016187357 A1 | 11/2016 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Supplementary European Search Report, dated Jul. 21, 2016 in European Patent Application No. EP 14818136.5, 9 pages.
L.H. Hsieh et al., Development of a Retrodirective Wireless Microwave Power Transmission System, IEEE, 2003, pp. 393-396.
B.D. Van Veen et al., Beamforming: A Versatile Approach to Spatial Filtering, IEEE ASSP Magazine, Apr. 1988, pp. 4-24.
M. Leabman, Adaptive Band-Partitioning for Interference Cancellation in Communication Systems, Thesis, Massachusetts Institute of Technology, Feb. 1997, pp. 1-70.
International Search Report and Written Opinion dated Feb. 2, 2016 in International Application No. PCT/US15/67287, 9 pages.
International Search Report and Written Opinion dated Mar. 4, 2016 in International Application No. PCT/US15/67291, 10 pages.
International Search Report and Written Opinion of the International Searching Authority dated Mar. 3, 2016 in International Application No. PCT/US15/67275, 33 pages.
International Search Report and Written Opinion of the International Searching Authority, or the Declaration, dated Mar. 22, 2016 in International Application No. PCT/US15/067279, 13 pages.
Notification of Transmittal of The International Search Report and The Written Opinion of the International Searching Authority, or The Declaration issued in International Application No. PCT/US15/67242 dated Mar. 16, 2016.
International Search Report and Written Opinion of the International Searching Authority mailed Mar. 10, 2016 in International Application No. PCT/US15/67243, 16 pages.

(56) References Cited

OTHER PUBLICATIONS

Notification of Transmittal of the International Search Report and The Written Opinion of the International Searching Authority, or the Declaration issued in International Application No. PCT/US15/67245 dated Mar. 17, 2016, 9 pages.
International Search Report issued in International Application No. PCT/US2014/037109 dated Apr. 8, 2016, 4 pages.
International Search Report and Written Opinion of the International Searching Authority dated Mar. 30, 2016 in International Application No. PCT/US15/67250, 17 pages.
International Search Report and Written Opinion dated Dec. 22, 2014 in International Application No. PCT/US2014/055195, 12 pages.
Singh, V. et al., "Wireless Power Transfer Using Metamaterial Bonded Microstrip Antenna for Smart Grid WSN," In Fourth International Conference on Advances in Computing and Communications (ICACC), Aug. 27-29, 2014, Abstract, p. 299.
International Search Report and Written Opinion of the International Search Authority dated Mar. 20, 2015 in International Application No. PCT/US2014/068568, 10 pages.
International Search Report and Written Opinion of the International Searching Authority dated May 11, 2016 in International Application No. PCT/US2015/067246, 18 pages.
International Search Report and Written Opinion of the International Searching Authority dated Mar. 29, 2016 in International Application No. PCT/US2015/067249, 14 pages.
T. Gill et al., "A System for Change Detection and Human Recognition in Voxel Space Using the Microsoft Kinect Sensor", 2011 IEEE Applied Imagery Pattern Recognition Workshop, Oct. 2011, 8 pages.
J. Han et al., Enhanced Computer Vision with Microsoft Kinect Sensor: A Review, IEEE Transactions on Cybernetics, vol. 43, No. 5, Oct. 2013, p. 1318-1334.
Energous Corp., Written Opinion, PCT/US2014/037170, dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., Isrwo, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/67291, dated Mar. 4, 2016, 10 pgs.
Energous Corp., IPRP, PCT/US2014/037109, dated Apr. 12, 2016, 9 pgs.
Energous Corp., ISRWO, PCT/US2015/067325, dated Mar. 10, 2016, 9 pgs.
Energous Corp., ISRWO, PCT/US2014/040697, dated Oct. 10, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067246, dated May 11, 2016, 12 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Jan. 26, 2016, 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Jan. 15, 2015, 11 pgs.
Energous Corp., ISRWO, PCT/US2015/067282, dated Jul. 5, 2016, 7 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP , PCT/US2014/045237, dated Jan. 12, 2016, 12 pgs.
Energous Corp., ISRWO , PCT/US2014/054897, dated Feb. 17, 2015, 10 pgs.
Energous Corp., IPRP , PCT/US2014/054897, dated Mar. 15, 2016, 8 pgs.
Energous Corp., ISRWO , PCT/US2015/067334, Mar. 3, 2016, 6 pgs.

(56) References Cited

OTHER PUBLICATIONS

Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 12 pgs.
Energous Corp., ISRWO, PCT/US2014/062672 dated Jan. 26, 2015, 11 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Panda, SIW based Slot Array Antenna and Power Management Circuit for Wireless Energy Harvesting Applications, IEEE APSURSI, Jul. 2012, 2 pgs.
Zhai, "A Practical wireless charging system based on ultra-wideband retro-reflectie beamforming" 2010 IEEE Antennas and Propagation Society International Symposium, Toronto, ON 2010, pp. 1-4.
Energous Corp., IPRP, PCT/US2014/046956, dated Jan. 19, 2016, 7 pgs.
Energous Corp., IPRP, PCT/US2015/067291, dated Jul. 4, 2017, 4 pgs.
Energous Corp., IPRP, PCT/US2015/067242, dated Jun. 27, 2017, 7 pgs.
Energous Corp., ISRWO, PCT/US2015/067243, dated Jun. 27, 2017, 7 pgs.
Energous Corp., IPRP, PCT/US2015/067275, dated Jul. 4, 2017, 7 pgs.
Energous Corp., IPRP, PCT/US2015/067245, dated Jun. 27, 2017, 7 pgs.
Energous Corp., IPRP, PCT/US2014/041546, dated Dec. 29, 2015, 9 pgs.
Energous Corp., IPRP, PCT/US2015/67250, dated Mar. 30, 2016, 10 pgs.
Energous Corp., IPRP, PCT/US2015/067325, dated Jul. 4, 2017, 8 pgs.
Energous Corp., IPRP, PCT/US2015/067249, dated Jun. 27, 2017, 7 pgs.
Energous Corp., IPRP, PCT/US2015/067246, dated Jun. 27, 2017, 9 pgs.
Energous Corp., IPRP, PCT/US2015/067279, dated Jul. 4, 2017, 7 pgs.
Energous Corp., IPRP, PCT/US2015/067282, dated Jul. 4, 2017, 6 pgs.
Energous Corp., IPRP, PCT/US2015/067334, dated Jul. 4, 2017, 5 pgs.
Energous Corp., IPRP, PCT/US2015/067294, dated Jul. 4, 2017, 6 pgs.
Energous Corp., IPRP, PCT/US2014/062672 dated May 10, 2016, 8 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316, dated Mar. 16, 2017, 15 pgs.
Energous Corp., IPRP, PCT/US2015/067294, dated Jul. 4, 6 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.

\* cited by examiner

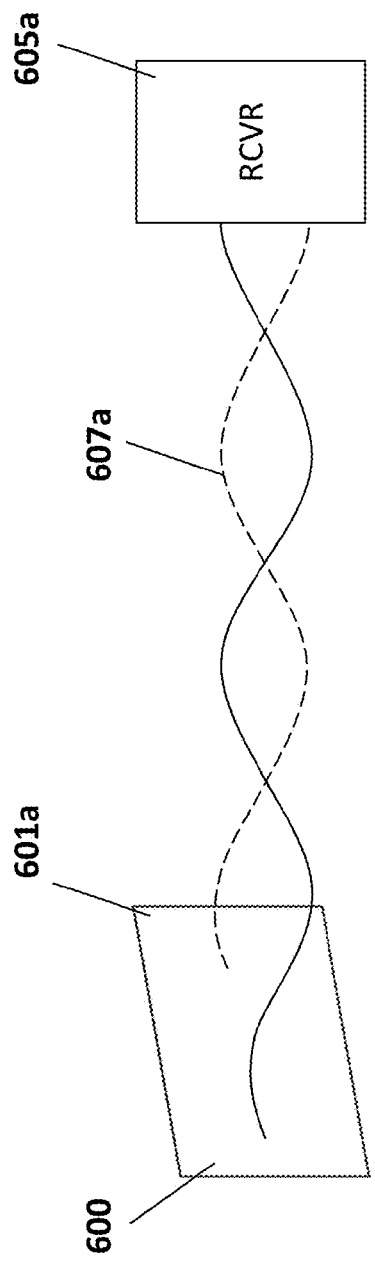
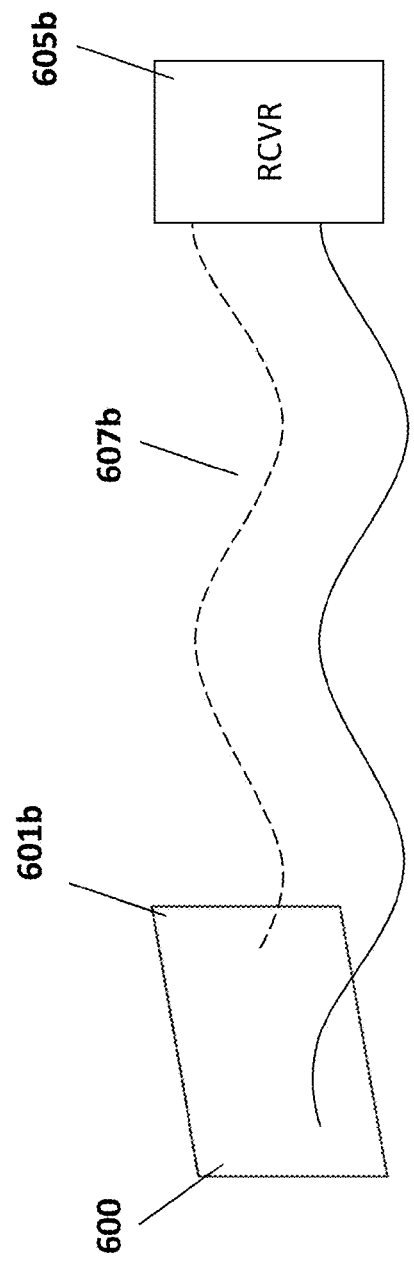

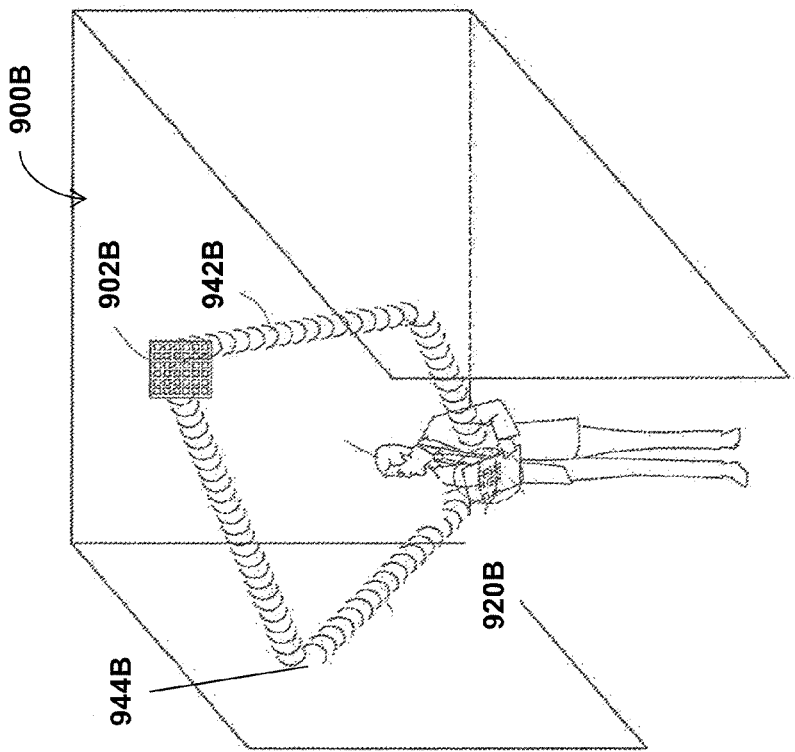
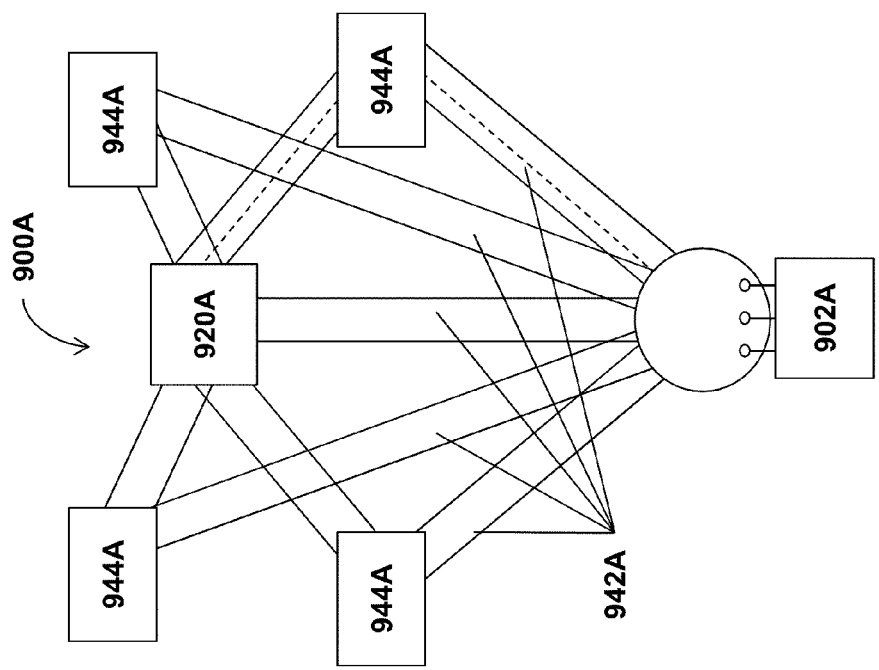
FIG. 9B
FIG. 9A

CLUSTER MANAGEMENT OF TRANSMITTERS IN A WIRELESS POWER TRANSMISSION SYSTEM

CROSS-REFERENCE TO RELATED APPLICATIONS

This application is a continuation of U.S. Non-Provisional patent application Ser. No. 14/587,616, filed Dec. 31, 2014, entitled "Cluster Management of Transmitters In A Wireless Power Transmission System," which is a continuation-in-part of U.S. Non-Provisional patent application Ser. No. 14/272,124, filed May 7, 2014, entitled "System and Method for Controlling Communication Between Wireless Power Transmitter Managers," which are herein fully incorporated by reference in their entirety.

This application relates to U.S. Non-Provisional patent application Ser. No. 13/891,430, filed May 10, 2013, entitled "Methodology For Pocket-forming;" U.S. Non-Provisional patent application Ser. No. 13/925,469, filed Jun. 24, 2013, entitled "Methodology for Multiple Pocket-Forming;" U.S. Non-Provisional patent application Ser. No. 13/946,082, filed Jul. 19, 2013, entitled "Method for 3 Dimensional Pocket-forming;" U.S. Non-Provisional patent application Ser. No. 13/891,399, filed May 10, 2013, entitled "Receivers for Wireless Power Transmission;" U.S. Non-Provisional patent application Ser. No. 13/891,445, filed May 10, 2013, entitled "Transmitters for Wireless Power Transmission;" U.S. Non-Provisional patent application Ser. No. 14/336,987, filed Jul. 21, 2014, entitled "System and Method for Smart Registration of Wireless Power Receivers in a Wireless Power Network," U.S. Non-Provisional patent application Ser. No. 14/286,289, filed May 23, 2014, entitled "System and Method for Generating a Power Receiver Identifier in a Wireless Power Network," U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

TECHNICAL FIELD

The present disclosure relates generally to wireless power transmission.

BACKGROUND

Portable electronic devices such as smart phones, tablets, notebooks and other electronic devices have become an everyday need in the way we communicate and interact with others. The frequent use of these devices may require a significant amount of power, which may easily deplete the batteries attached to these devices. Therefore, a user is frequently needed to plug in the device to a power source, and recharge such device. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging.

Current solutions to this problem may include devices having rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. In this case, the device still requires to be placed in a certain location for a period of time in order to be charged. Assuming a single source power transmission of electromagnetic (EM) signal, an EM signal gets reduced by a factor proportional to $1/r2$ in magnitude over a distance r, in other words, it is attenuated proportional to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device.

SUMMARY

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device. Accordingly, the embodiments for wireless power transmission can allow powering and charging a plurality of electrical devices without wires.

A wireless power network may include wireless power transmitters each with an embedded wireless power transmitter manager. The wireless power transmitter manager may include a wireless power manager application, which may be a software application hosted in a computing device. The wireless power transmitter manager may include a GUI which may be used by a user to perform management tasks.

The wireless power network may include a plurality of client devices with wireless power receivers built in as part of the device or adapted externally. Wireless power receivers may include a power receiver application configured to communicate with the power transmitter manager application in a wireless power transmitter. The wireless power manager application may include a device database where information about the wireless power network may be stored.

In one embodiment, a system for providing simultaneous communication in a wireless power delivery network, comprises: a plurality of power transmitters communicatively coupled to at least one transmitter manager; and at least one power receiver communicatively coupled to at least one user device; wherein the at least one transmitter manager receives from the at least one user device a selection indicator indicative of at least one of signal strength or proximity of the at least one user device relative to ones of the plurality of power transmitters; and wherein the transmission of controlled power transmission signals to produce a plurality of pockets of energy by ones of the plurality of power transmitters to the at least one power receiver is controlled by the at least one transmitter manager in accordance with the selection indicator.

In another embodiment, a method for providing simultaneous communication in a wireless power delivery network, comprises: transmitting, by at least one of a plurality of power transmitters, controlled power transmission signals to produce a plurality of pockets of energy to at least one power receiver communicatively coupled to at least one user device; and receiving, by at least one transmission manager of the at least one the plurality of power transmitters, a selection indicator indicative of signal strength or proximity of the at least one user device relative to the at least one of the plurality of power transmitters; wherein the transmitting by the at least one of the plurality of power transmitters to the at least one power receiver is controlled by the at least one transmitter manager in accordance with the selection indicator.

In a further embodiment, a system for providing simultaneous communication in a wireless power delivery network, comprises: a plurality of power transmitters communicatively coupled to at least one transmitter manager; and at least one power receiver communicatively coupled to at least one user device; wherein the at least one transmitter manager receives from the at least one user device a selection indicator indicative of at least one of signal strength or proximity of the at least one user device relative to ones of the plurality of power transmitters; and wherein the transmission of controlled power transmission signals to produce a plurality of pockets of energy by ones of the plurality of power transmitters to the at least one power receiver is controlled by the at least one transmitter manager in accordance with the selection indicator.

In another embodiment, a system for providing contemporaneous communication in a wireless power delivery network, comprises: a plurality of power transmitters communicatively coupled to at least one transmitter manager; and a power receiver communicatively coupled to a user device, wherein at least two of the plurality of power transmitters are available to generate pocket-forming energy in three dimensional space at the power receiver to charge or power the user device; wherein the at least one transmitter manager coordinates contemporaneous communication of the plurality of power transmitters with the power receiver via time division multiplexing (TDM) of such communication; wherein the at least one transmitter manager controls the transmission of controlled power transmission signals to produce a plurality of pockets of energy at the power receiver is in accordance with the time division multiplexing (TDM) of the contemporaneous communication.

In a further embodiment, a method for providing contemporaneous communication in a wireless power delivery network, comprises: transmitting, by at least one of a plurality of power transmitters, controlled power transmission signals to produce a plurality of pockets of energy to at least one power receiver communicatively coupled to at least one user device; and coordinating, by the at least one transmitter manager of the plurality of power transmitters, contemporaneous communication of the plurality of power transmitters with the power receiver via time division multiplexing (TDM) of such communication; wherein the at least one transmitter manager controls the transmission of controlled power transmission signals to produce a plurality of pockets of energy at the power receiver in accordance with the time division multiplexing (TDM) of the contemporaneous communication.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 6A illustrates waveforms for wireless power transmission with selective range, which may get unified in single waveform.

FIG. 6B illustrates waveforms for wireless power transmission with selective range, which may get unified in single waveform.

FIGS. 9A and 9B illustrate a diagram of an architecture for wirelessly charging client computing platform, according to an exemplary embodiment

DETAILED DESCRIPTION

Figure 1:
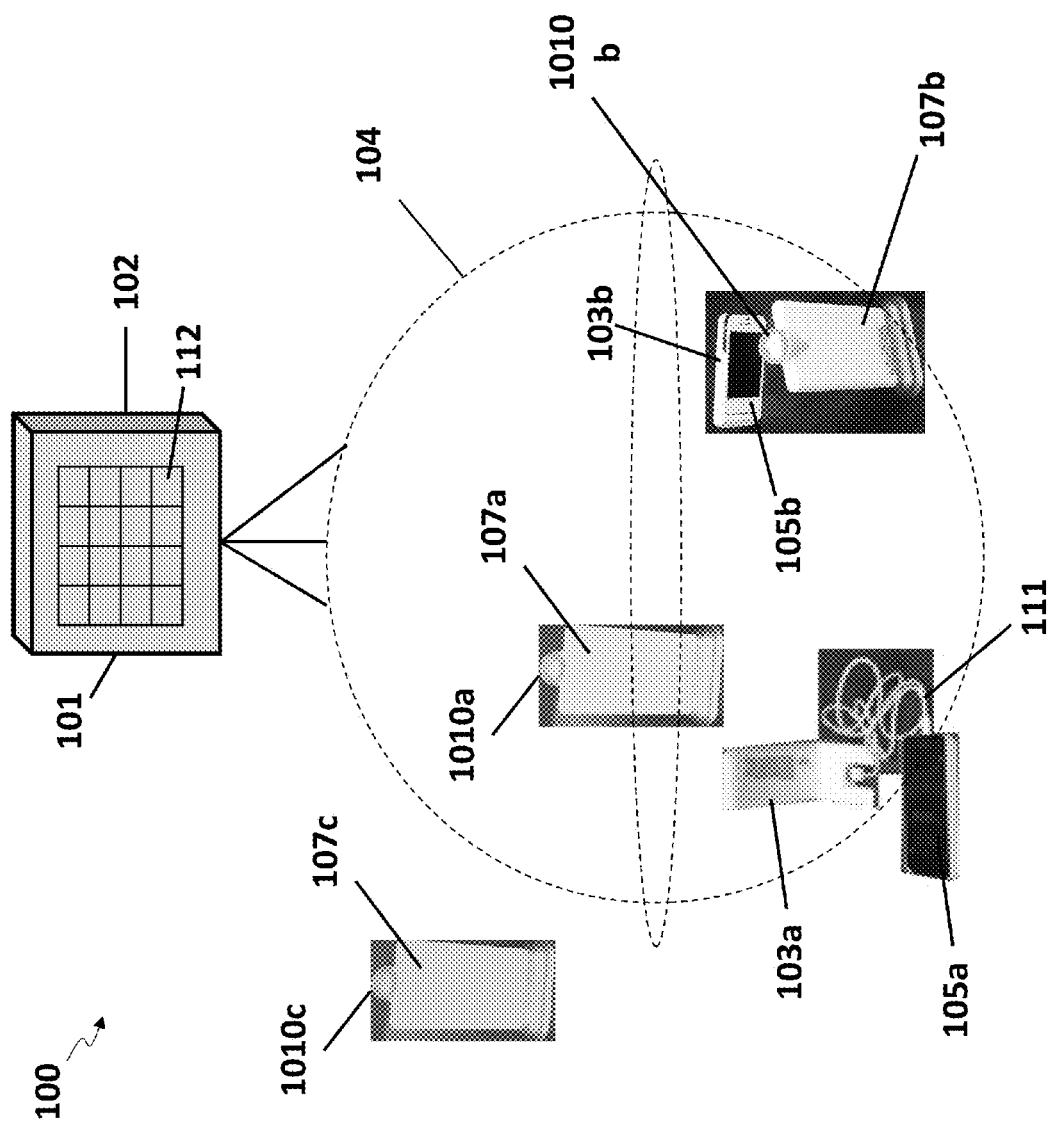
FIG. 1 illustrates a system overview, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

I. Systems and Methods for Wireless Power Transmissions

A. Components System Embodiment

FIG. 1 shows a system 100 for wireless power transmission by forming pockets of energy 104. The system 100 may comprise transmitters 101, receivers 103, client devices 105, and pocket detectors 107. Transmitters 101 may transmit power transmission signals comprising power transmission waves, which may be captured by receivers 103. The receivers 103 may comprise antennas, antenna elements, and other circuitry (detailed later), which may convert the captured waves into a useable source of electrical energy on behalf of client devices 105 associated with the receivers 103. In some embodiments, transmitters 101 may transmit power transmission signals, made up of power transmission waves, in one or more trajectories by manipulating the phase, gain, and/or other waveform features of the power transmission waves, and/or by selecting different transmit antennas. In such embodiments, the transmitters 101 may manipulate the trajectories of the power transmission signals so that the underlying power transmission waves converge at a location in space, resulting in certain forms of interference. One type of interference generated at the convergence of the power transmission waves, "constructive interference," may be a field of energy caused by the convergence of the power transmission waves such that they add together and strengthen the energy concentrated at that location—in contrast to adding together in a way to subtract from each other and diminish the energy concentrated at that location, which is called "destructive interference". The accumulation of sufficient energy at the constructive interference may establish a field of energy, or "pocket of energy" 104, which may be harvested by the antennas of a receiver 103, provided the antennas are configured to operate on the frequency of the power transmission signals. Accordingly, the power transmission waves establish pockets of energy 104 at the location in space where the receivers 103 may receive, harvest, and convert the power transmission waves into useable electrical energy, which may power or charge associated electrical client devices 105. Detectors 107 may be devices comprising a receiver 103 that are capable of producing a notification or alert in response to receiving power transmission signals. As an example, a user searching for the optimal placement of a receiver 103 to charge the user's client device 105 may use a detector 107 that comprises an LED light 108, which may brighten when the detector 107 captures the power transmission signals from a single beam or a pocket of energy 104.

1. Transmitters

The transmitter 101 may transmit or broadcast power transmission signals to a receiver 103 associated with a device 105. Although several of the embodiments mentioned below describe the power transmission signals as radio frequency (RF) waves, it should be appreciated that the power transmission may be physical media that is capable of being propagated through space, and that is capable of being converted into a source of electrical energy 103. The transmitter 101 may transmit the power transmission signals as a single beam directed at the receivers 103. In some cases, one or more transmitters 101 may transmit a plurality of power transmission signals that are propagated in a multiple directions and may deflect off of physical obstructions (e.g., walls). The plurality of power transmission signals may converge at a location in a three-dimensional space, forming a pocket of energy 104. Receivers 103 within the boundaries of an energy pocket 104 may capture and covert the power transmission signals into a useable source of energy. The transmitter 101 may control pocket-forming based on phase and/or relative amplitude adjustments of power transmission signals, to form constructive interference patterns.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 101 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure. The transmitter includes an antenna array where the antennas are used for sending the power transmission signal. Each antenna sends power transmission waves where the transmitter applies a different phase and amplitude to the signal transmitted from different antennas. Similar to the formation of pockets of energy, the transmitter can form a phased array of delayed versions of the signal to be transmitted, then applies different amplitudes to the delayed versions of the signal, and then sends the signals from appropriate antennas. For a sinusoidal waveform, such as an RF signal, ultrasound, microwave, or others, delaying the signal is similar to applying a phase shift to the signal.

2. Pockets of Energy

A pocket of energy 104 may be formed at locations of constructive interference patterns of power transmission signals transmitted by the transmitter 101. The pockets of energy 104 may manifest as a three-dimensional field where energy may be harvested by receivers 103 located within the pocket of energy 104. The pocket of energy 104 produced by transmitters 101 during pocket-forming may be harvested by a receiver 103, converted to an electrical charge, and then provided to electronic client device 105 associated with the receiver 103 (e.g., laptop computer, smartphone, rechargeable battery). In some embodiments, there may be multiple transmitters 101 and/or multiple receivers 103 powering various client devices 105. In some embodiments, adaptive pocket-forming may adjust transmission of the power transmission signals in order to regulate power levels and/or identify movement of the devices 105.

3. Receivers

A receiver 103 may be used for powering or charging an associated client device 105, which may be an electrical device coupled to or integrated with the receiver 103. The receiver 103 may receive power transmission waves from one or more power transmission signals originating from one or more transmitters 101. The receiver 103 may receive the power transmission signals as a single beam produced by the transmitter 101, or the receiver 103 may harvest power transmission waves from a pocket of energy 104, which may be a three-dimensional field in space resulting from the convergence of a plurality of power transmission waves produced by one or more transmitters 101. The receiver 103 may comprise an array of antennas 112 configured to receive power transmission waves from a power transmission signal and harvest the energy from the power transmission signals of the single beam or pocket of energy 104. The receiver 103 may comprise circuitry that then converts the energy of the power transmission signals (e.g., the radio frequency electromagnetic radiation) to electrical energy. A rectifier of the receiver 103 may translate the electrical energy from AC to DC. Other types of conditioning may be applied, as well. For example, a voltage conditioning circuit may increase or decrease the voltage of the electrical energy as required by the client device 105. An electrical relay may then convey the electrical energy from the receiver 103 to the client device 105.

In some embodiments, the receiver 103 may comprise a communications component that transmits control signals to the transmitter 101 in order to exchange data in real-time or near real-time. The control signals may contain status information about the client device 105, the receiver 103, or the power transmission signals. Status information may include, for example, present location information of the device 105, amount of charge received, amount of charged used, and user account information, among other types of information. Further, in some applications, the receiver 103 including the rectifier that it contains may be integrated into the client device 105. For practical purposes, the receiver 103, wire 111, and client device 105 may be a single unit contained in a single packaging.

4. Control Signals

In some embodiments, control signals may serve as data inputs used by the various antenna elements responsible for controlling production of power transmission signals and/or pocket-forming. Control signals may be produced by the receiver 103 or the transmitter 101 using an external power supply (not shown) and a local oscillator chip (not shown), which in some cases may include using a piezoelectric material. Control signals may be RF waves or any other communication medium or protocol capable of communicating data between processors, such as BLUETOOTH®, RFID, infrared, near-field communication (NFC). As detailed later, control signals may be used to convey information between the transmitter 101 and the receiver 103 used to adjust the power transmission signals, as well as contain information related to status, efficiency, user data, power consumption, billing, geo-location, and other types of information.

5. Detectors

A detector 107 may comprise hardware similar to receivers 103, which may allow the detector 107 to receive power transmission signals originating from one or more transmitters 101. The detector 107 may be used by users to identify the location of pockets of energy 104, so that users may determine the preferable placement of a receiver 103. In some embodiments, the detector 107 may comprise an indicator light 108 that indicates when the detector is placed within the pocket of energy 104. As an example, in FIG. 1, detectors 107a, 107b are located within the pocket of energy 104 generated by the transmitter 101, which may trigger the detectors 107a, 107b to turn on their respective indicator lights 108*a*, 108*b*, because the detectors 107*a*, 107*b* are receiving power transmission signals of the pocket of energy 104; whereas, the indicator light 108*c* of a third detector 107*c* located outside of the pockets of energy 104, is turned off, because the third detector 107*c* is not receiving the power transmission signals from the transmitter 101. It should be appreciated that the functions of a detector, such as the indicator light, may be integrated into a receiver or into a client device in alternative embodiments as well.

6. Client Device

A client device 105 may be any electrical device that requires continuous electrical energy or that requires power from a battery. Non-limiting examples of client devices 105 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

In some embodiments, the client device 105*a* may be a physical device distinct from the receiver 103*a* associated with the client device 105*a*. In such embodiments, the client device 105*a* may be connected to the receiver over a wire 111 that conveys converted electrical energy from the receiver 103*a* to the client device 105*a*. In some cases, other types of data may be transported over the wire 111, such as power consumption status, power usage metrics, device identifiers, and other types of data.

In some embodiments, the client device 105*b* may be permanently integrated or detachably coupled to the receiver 103*b*, thereby forming a single integrated product or unit. As an example, the client device 105*b* may be placed into a sleeve that has embedded receivers 103*b* and that may detachably couple to the device's 105*b* power supply input, which may be typically used to charge the device's 105*b* battery. In this example, the device 105*b* may be decoupled from the receiver, but may remain in the sleeve regardless of whether or not the device 105*b* requires an electrical charge or is being used. In another example, in lieu of having a battery that holds a charge for the device 105*b*, the device 105*b* may comprise an integrated receiver 105*b*, which may be permanently integrated into the device 105*b* so as to form an indistinct product, device, or unit. In this example, the device 105*b* may rely almost entirely on the integrated receiver 103*b* to produce electrical energy by harvesting pockets of energy 104. It should be clear to someone skilled in the art that the connection between the receiver 103 and the client device 105 may be a wire 111 or may be an electrical connection on a circuit board or an integrated circuit, or even a wireless connection, such as inductive or magnetic.

B. Method of Wireless Power Transmission

Figure 2:
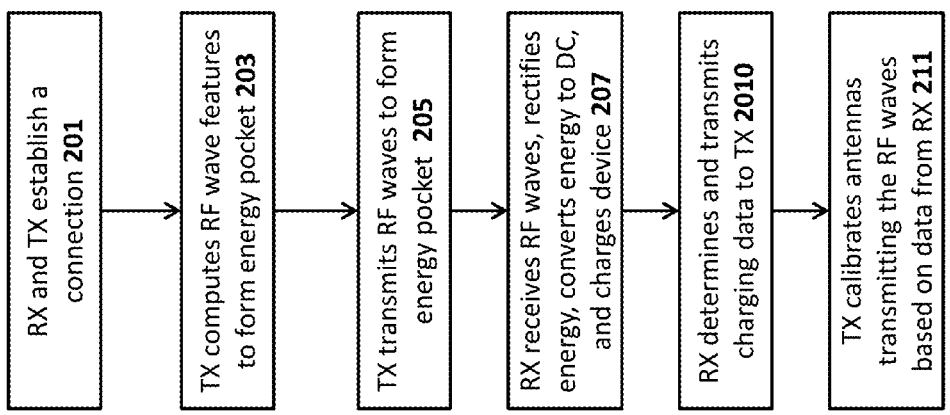
FIG. 2 illustrates steps of wireless power transmission, according to an exemplary embodiment.

FIG. 2 shows steps of wireless power transmission, according to an exemplary method 200 embodiment.

In a first step 201, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., BLUETOOTH®, Bluetooth Low Energy (BLE), Wi-Fi, NFC, ZIGBEE®). For example, in embodiments implementing BLUETOOTH® or BLUETOOTH® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

In a next step 203, the transmitter may use the advertisement signal to determine a set of power transmission signal features for transmitting the power transmission signals, to then establish the pockets of energy. Non-limiting examples of features of power transmission signals may include phase, gain, amplitude, magnitude, and direction among others. The transmitter may use information contained in the receiver's advertisement signal, or in subsequent control signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may comprise a processor executing software modules capable of automatically identifying the power transmission signal features needed to establish a pocket of energy based on information received from the receiver, such as the voltage of the electrical energy harvested by the receiver from the power transmission signals. It should be appreciated that in some embodiments, the functions of the processor and/or the software modules may be implemented in an Application Specific Integrated Circuit (ASIC).

Additionally or alternatively, in some embodiments, the advertisement signal or subsequent signal transmitted by the receiver over a second communications channel may indicate one or more power transmission signals features, which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter the phase and gain for effectively transmitting the power transmission signals.

In a next step 205, after the transmitter determines the appropriate features to use when transmitting the power transmission signals, the transmitter may begin transmitting power transmission signals, over a separate channel from the control signals. Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases, a plurality of antenna elements may be used to transmit power transmission signals in order to establish the pocket of energy. Moreover, in some cases, the plurality of antennas may include all of the antennas in the transmitter; and, in some cases, the plurality of antennas may include a number of the antennas in the transmitter, but fewer than all of the antennas of the transmitter.

As previously mentioned, the transmitter may produce and transmit power transmission signals, according to a determined set of power transmission signal features, which may be produced and transmitted using an external power source and a local oscillator chip comprising a piezoelectric material. The transmitter may comprise an RFIC that controls production and transmission of the power transmission signals based on information related to power transmission and pocket-forming received from the receiver. This control data may be communicated over a different channel from the power transmission signals, using wireless communications protocols, such as BLE, NFC, or ZIGBEE®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

Antenna elements of the transmitter may use concepts of wave interference to determine certain power transmission signals features (e.g., direction of transmission, phase of power transmission signal wave), when transmitting the power transmission signals during pocket-forming. The antenna elements may also use concepts of constructive interference to generate a pocket of energy, but may also utilize concepts of deconstructive interference to generate a transmission null in a particular physical location.

In some embodiments, the transmitter may provide power to a plurality of receivers using pocket-forming, which may require the transmitter to execute a procedure for multiple pocket-forming. A transmitter comprising a plurality of antenna elements may accomplish multiple pocket-forming by automatically computing the phase and gain of power transmission signal waves, for each antenna element of the transmitter tasked with transmitting power transmission signals the respective receivers. The transmitter may compute the phase and gains independently, because multiple wave paths for each power transmission signal may be generated by the transmitter's antenna elements to transmit the power transmission signals to the respective antenna elements of the receiver.

As an example of the computation of phase/gain adjustments for two antenna elements of the transmitter transmitting two signals, say X and Y where Y is 180 degree phase shifted version of X (Y=−X). At a physical location where the cumulative received waveform is X−Y, a receiver receives X−Y=X+X=2X, whereas at a physical location where the cumulative received waveform is X+Y, a receiver receives X+Y=X−X=0.

In a next step 207, the receiver may harvest or otherwise receive electrical energy from power transmission signals of a single beam or a pocket of energy. The receiver may comprise a rectifier and AC/DC converter, which may convert the electrical energy from AC current to DC current, and a rectifier of the receiver may then rectify the electrical energy, resulting in useable electrical energy for a client device associated with the receiver, such as a laptop computer, smartphone, battery, toy, or other electrical device. The receiver may utilize the pocket of energy produced by the transmitter during pocket-forming to charge or otherwise power the electronic device.

In next step 209, the receiver may generate control data containing information indicating the effectiveness of the single beam or energy pockets providing the receiver power transmission signals. The receiver may then transmit control signals containing the control data, to the transmitter. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The control data may contain information related to transmitting power transmission signals and/or establishing effective pockets of energy. Some of the information in the control data may inform the transmitter how to effectively produce and transmit, and in some cases adjust, the features of the power transmission signals. Control signals may be transmitted and received over a second channel, independent from the power transmission signals, using a wireless protocol capable of transmitting control data related to power transmission signals and/or pocket-forming, such as BLE, NFC, Wi-Fi, or the like.

As mentioned, the control data may contain information indicating the effectiveness of the power transmission signals of the single beam or establishing the pocket of energy. The control data may be generated by a processor of the receiver monitoring various aspects of receiver and/or the client device associated with the receiver. The control data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of feature (e.g., direction, phase, gain, amplitude). In some embodiments, a processor of the transmitter may automatically determine more effective features for producing and transmitting the power transmission signals based on a control signal received from the receiver. The control signal may contain control data, and may be transmitted by the receiver using any number of wireless communication protocols (e.g., BLE, Wi-Fi, ZIGBEE®). The control data may contain information expressly indicating the more effective features for the power transmission waves; or the transmitter may automatically determine the more effective features based on the waveform features of the control signal (e.g., shape, frequency, amplitude). The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

C. System Architecture of Power Transmission System

Figure 3:
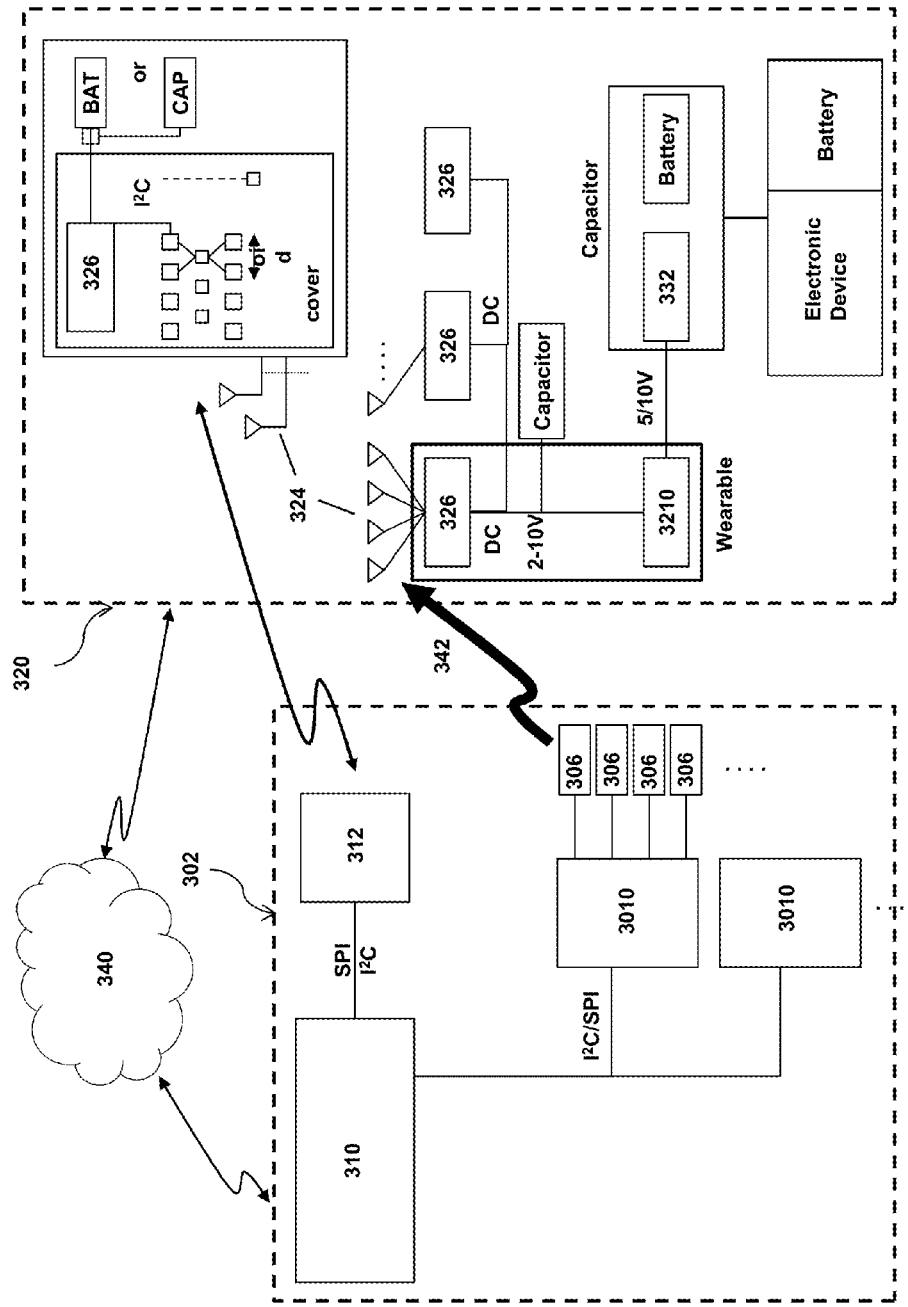
FIG. 3 illustrates an architecture for wireless power transmission, according to an exemplary embodiment.

FIG. 3 illustrates an architecture 300 for wireless power transmission using pocket-forming, according to an exemplary embodiment. "Pocket-forming" may refer to generating two or more power transmission waves 342 that converge at a location in three-dimensional space, resulting in constructive interference patterns at that location. A transmitter 302 may transmit and/or broadcast controlled power transmission waves 342 (e.g., microwaves, radio waves, ultrasound waves) that may converge in three-dimensional space. These power transmission waves 342 may be controlled through phase and/or relative amplitude adjustments to form constructive interference patterns (pocket-forming) in locations where a pocket of energy is intended. It should be understood also that the transmitter can use the same principles to create destructive interference in a location thereby creating a transmission null—a location where transmitted power transmission waves cancel each other out substantially and no significant energy can be collected by a receiver. In typical use cases the aiming of a power transmission signal at the location of the receiver is the objective; and in other cases it may be desirable to specifically avoid power transmission to a particular location; and in other cases it may be desirable to aim power transmission signal at a location while specifically avoiding transmission to a second location at the same time. The transmitter takes the use case into account when calibrating antennas for power transmission.

Antenna elements 306 of the transmitter 302 may operate in single array, pair array, quad array, or any other suitable arrangement that may be designed in accordance with the desired application. Pockets of energy may be formed at constructive interference patterns where the power transmission waves 342 accumulate to form a three-dimensional field of energy, around which one or more corresponding transmission null in a particular physical location may be generated by destructive interference patterns. Transmission null in a particular physical location-may refer to areas or regions of space where pockets of energy do not form because of destructive interference patterns of power transmission waves 342.

A receiver 320 may then utilize power transmission waves 342 emitted by the transmitter 302 to establish a pocket of energy, for charging or powering an electronic device 313, thus effectively providing wireless power transmission. Pockets of energy may refer to areas or regions of space where energy or power may accumulate in the form of constructive interference patterns of power transmission waves 342. In other situations there can be multiple transmitters 302 and/or multiple receivers 320 for powering various electronic equipment for example smartphones, tablets, music players, toys and others at the same time. In other embodiments, adaptive pocket-forming may be used to regulate power on electronic devices. Adaptive pocket-forming may refer to dynamically adjusting pocket-forming to regulate power on one or more targeted receivers.

Receiver 320 may communicate with transmitter 302 by generating a short signal through antenna elements 324 in order to indicate its position with respect to the transmitter 302. In some embodiments, receiver 320 may additionally utilize a network interface card (not shown) or similar computer networking component to communicate through a network 340 with other devices or components of the system 300, such as a cloud computing service that manages several collections of transmitters 302. The receiver 320 may comprise circuitry 308 for converting the power transmission signals 342 captured by the antenna elements 324, into electrical energy that may be provided to and electric device 313 and/or a battery of the device 315. In some embodiments, the circuitry may provide electrical energy to a battery of receiver 335, which may store energy without the electrical device 313 being communicatively coupled to the receiver 320.

Communications components 324 may enable receiver 320 to communicate with the transmitter 302 by transmitting control signals 345 over a wireless protocol. The wireless protocol can be a proprietary protocol or use a conventional wireless protocol, such as BLUETOOTH®, Wi-Fi, NFC, ZIGBEE®, and the like. Communications component 324 may then be used to transfer information, such as an identifier for the electronic device 313, as well as battery level information, geographic location data, or other information that may be of use for transmitter 302 in determining when to send power to receiver 320, as well as the location to deliver power transmission waves 342 creating pockets of energy. In other embodiments, adaptive pocket-forming may be used to regulate power provided to electronic devices 313. In such embodiments, the communications components 324 of the receiver may transmit voltage data indicating the amount of power received at the receiver 320, and/or the amount of voltage provided to an electronic device 313b or battery 315.

Once transmitter 302 identifies and locates receiver 320, a channel or path for the control signals 345 can be established, through which the transmitter 302 may know the gain and phases of the control signals 345 coming from receiver 320. Antenna elements 306 of the transmitter 302 may start to transmit or broadcast controlled power transmission waves 342 (e.g., radio frequency waves, ultrasound waves), which may converge in three-dimensional space by using at least two antenna elements 306 to manipulate the power transmission waves 342 emitted from the respective antenna element 306. These power transmission waves 342 may be produced by using an external power source and a local oscillator chip using a suitable piezoelectric material. The power transmission waves 342 may be controlled by transmitter circuitry 301, which may include a proprietary chip for adjusting phase and/or relative magnitudes of power transmission waves 342. The phase, gain, amplitude, and other waveform features of the power transmission waves 342 may serve as inputs for antenna element 306 to form constructive and destructive interference patterns (pocket-forming). In some implementations, a micro-controller 310 or other circuit of the transmitter 302 may produce a power transmission signal, which comprises power transmission waves 342, and that may be may split into multiple outputs by transmitter circuitry 301, depending on the number of antenna elements 306 connected to the transmitter circuitry 301. For example, if four antenna elements 306a-d are connected to one transmitter circuit 301a, the power transmission signal will be split into four different outputs each output going to an antenna element 306 to be transmitted as power transmission waves 342 originating from the respective antenna elements 306.

Pocket-forming may take advantage of interference to change the directionality of the antenna element 306 where constructive interference generates a pocket of energy and destructive interference generates a transmission null.

Receiver 320 may then utilize pocket of energy produced by pocket-forming for charging or powering an electronic device and therefore effectively providing wireless power transmission.

Multiple pocket-forming may be achieved by computing the phase and gain from each antenna 306 of transmitter 302 to each receiver 320.

D. Components of Systems Forming Pockets of Energy

Figure 4:
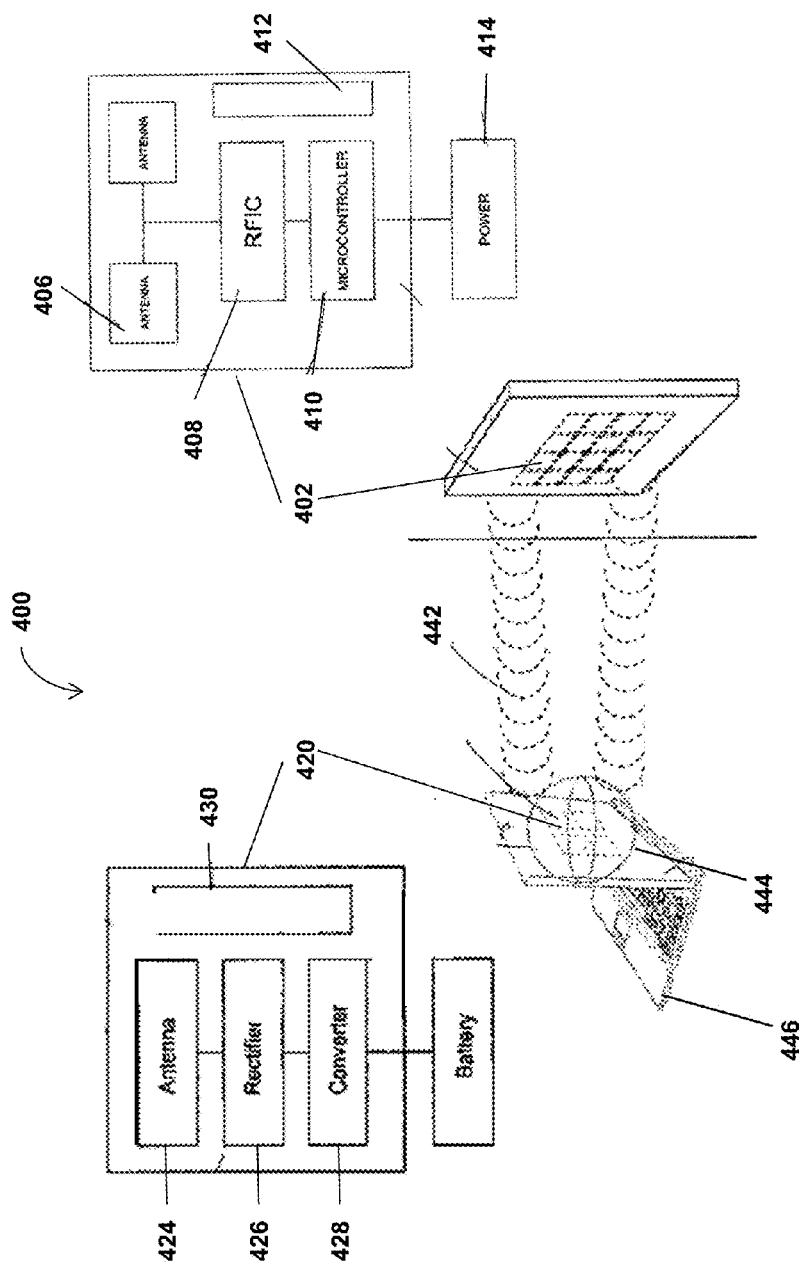
FIG. 4 illustrates components of a system of wireless power transmission using pocket-forming procedures, according to an exemplary embodiment.

FIG. 4 shows components of an exemplary system 400 of wireless power transmission using pocket-forming procedures. The system 400 may comprise one or more transmitters 402, one or more receivers 420, and one or more client devices 446.

1. Transmitters

Transmitters 402 may be any device capable of broadcasting wireless power transmission signals, which may be RF waves 442, for wireless power transmission, as described herein. Transmitters 402 may be responsible for performing tasks related to transmitting power transmission signals, which may include pocket-forming, adaptive pocket-forming, and multiple pocket-forming. In some implementations, transmitters 402 may transmit wireless power transmissions to receivers 420 in the form of RF waves, which may include any radio signal having any frequency or wavelength. A transmitter 402 may include one or more antenna elements 406, one or more RFICs 408, one or more microcontrollers 410, one or more communication components 412, a power source 414, and a housing that may allocate all the requested components for the transmitter 402. The various components of transmitters 402 may comprise, and/or may be manufactured using, meta-materials, micro-printing of circuits, nano-materials, and the like.

In the exemplary system 400, the transmitter 402 may transmit or otherwise broadcast controlled RF waves 442 that converge at a location in three-dimensional space, thereby forming a pocket of energy 444. These RF waves may be controlled through phase and/or relative amplitude adjustments to form constructive or destructive interference patterns (i.e., pocket-forming). Pockets of energy 444 may be fields formed at constructive interference patterns and may be three-dimensional in shape; whereas transmission null in a particular physical location may be generated at destructive interference patterns. Receivers 420 may harvest electrical energy from the pockets of energy 444 produced by pocket-forming for charging or powering an electronic client device 446 (e.g., a laptop computer, a cell phone). In some embodiments, the system 400 may comprise multiple transmitters 402 and/or multiple receivers 420, for powering various electronic equipment. Non-limiting examples of client devices 446 may include: smartphones, tablets, music players, toys and others at the same time. In some embodiments, adaptive pocket-forming may be used to regulate power on electronic devices.

2. Receivers

Receivers 420 may include a housing where at least one antenna element 424, one rectifier 426, one power converter 428, and a communications component 430 may be included.

Housing of the receiver 420 can be made of any material capable of facilitating signal or wave transmission and/or reception, for example plastic or hard rubber. Housing may be an external hardware that may be added to different electronic equipment, for example in the form of cases, or can be embedded within electronic equipment as well.

3. Antenna Elements

Antenna elements 424 of the receiver 420 may comprise any type of antenna capable of transmitting and/or receiving signals in frequency bands used by the transmitter 402A. Antenna elements 424 may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements 424 of the receiver 420, may include patch antennas, which may have heights from about ⅛ inch to about 6 inches and widths from about ⅛ inch to about 6 inches. Patch antennas may preferably have polarization that depends upon connectivity, i.e., the polarization may vary depending on from which side the patch is fed. In some embodiments, the type of antenna may be any type of antenna, such as patch antennas, capable of dynamically varying the antenna polarization to optimize wireless power transmission.

4. Rectifier

Rectifiers 426 of the receiver 420 may include diodes, resistors, inductors, and/or capacitors to rectify alternating current (AC) voltage generated by antenna elements 424 to direct current (DC) voltage. Rectifiers 426 may be placed as close as is technically possible to antenna elements A24B to minimize losses in electrical energy gathered from power transmission signals. After rectifying AC voltage, the resulting DC voltage may be regulated using power converters 428. Power converters 428 can be a DC-to-DC converter that may help provide a constant voltage output, regardless of input, to an electronic device, or as in this exemplary system 400, to a battery. Typical voltage outputs can be from about 5 volts to about 10 volts. In some embodiments, power converter may include electronic switched mode DC-DC converters, which can provide high efficiency. In such embodiments, the receiver 420 may comprise a capacitor (not shown) that is situated to receive the electrical energy before power converters 428. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 420 to provide the extra energy required. Afterwards, lower power can be provided. For example, ⅛₀ of the total initial power that may be used while having the phone or laptop still build-up charge.

5. Communications Component

A communications component 430 of a receiver 420 may communicate with one or more other devices of the system 400, such as other receivers 420, client devices, and/or transmitters 402. Different antenna, rectifier or power converter arrangements are possible for a receiver as will be explained in following embodiments.

E. Methods of Pocket Forming for a Plurality of Devices

Figure 5:
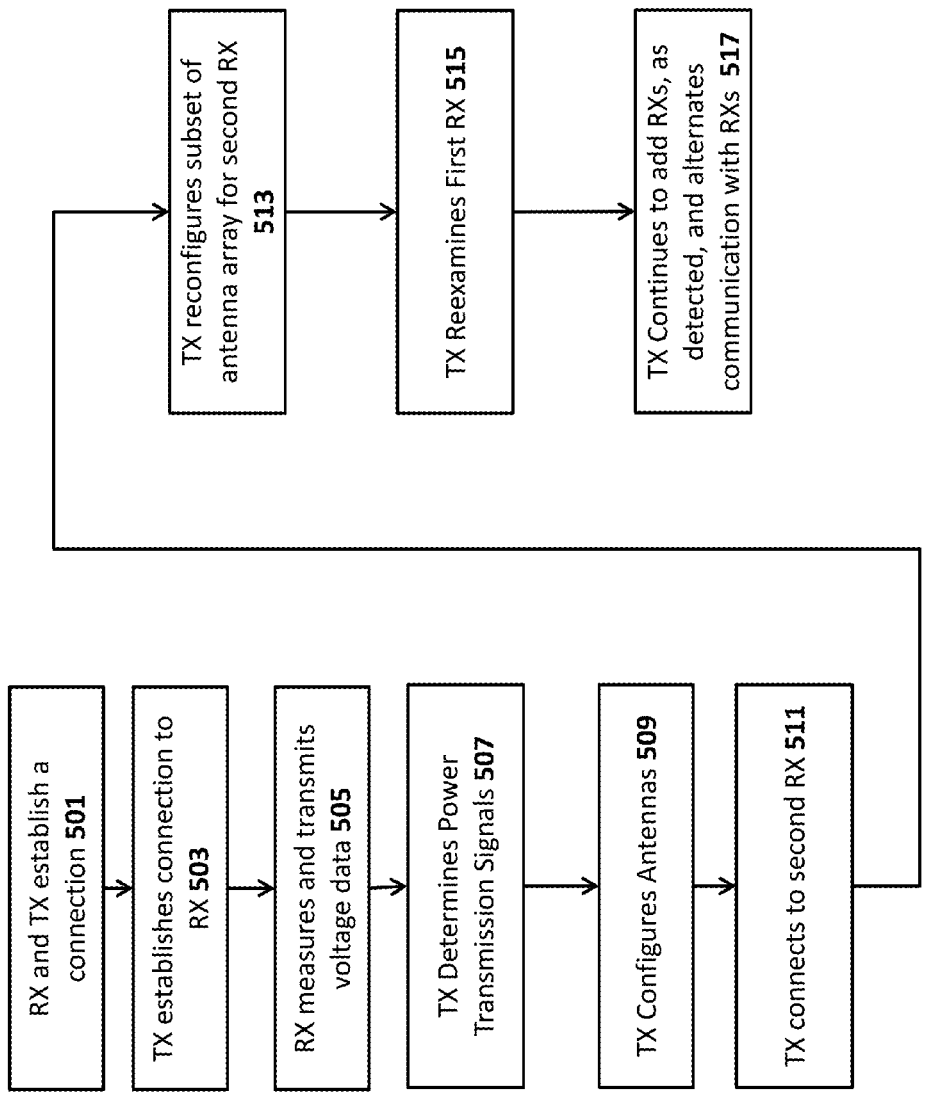
FIG. 5 illustrates steps of powering a plurality of receiver devices, according to an exemplary embodiment.

FIG. 5 shows steps of powering a plurality of receiver devices, according to an exemplary embodiment.

In a first step 501, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., BLUETOOTH®, BLE, Wi-Fi, NFC, ZIGBEE®). For example, in embodiments implement BLUETOOTH® or BLUETOOTH® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

As an example, when a receiver comprising a BLUETOOTH® processor is powered-up or is brought within a detection range of the transmitter, the Bluetooth processor may begin advertising the receiver according to BLUETOOTH® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 507, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antenna transmit the power transmission signals, until that power received by the receiver indicates an effectively established pocket energy around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continues to receive and monitor the voltage being reported back from receiver.

In a next step 511, after a determined period of time for communicating with a particular receiver, the transmitter may scan and/or automatically detect advertisements from other receivers that may be in range of the transmitter. The transmitters may establish a connection to the second receiver responsive to BLUETOOTH® advertisements from a second receiver.

In a next step 513, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power transmission waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising that it's a Bluetooth device through the Bluetooth chip. Inside the advertisement, there may be unique identifiers so that the transmitter, when it scanned that advertisement, could distinguish that advertisement and ultimately that receiver from all the other Bluetooth devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may getting as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

F. Wireless Power Transmission with Selective Range

1. Constructive Interference

FIG. 6A and FIG. 6B show an exemplary system 600 implementing wireless power transmission principles that may be implemented during exemplary pocket-forming processes. A transmitter 601 comprising a plurality of antennas in an antenna array, may adjust the phase and amplitude, among other possible attributes, of power transmission waves 607, being transmitted from antennas of the transmitter 601. As shown in FIG. 6A, in the absence of any phase or amplitude adjustment, power transmission waves 607a may be transmitted from each of the antennas will arrive at different locations and have different phases. These differences are often due to the different distances from each antenna element of the transmitter 601a to a receiver 605a or receivers 605a, located at the respective locations.

Continuing with FIG. 6A, a receiver 605a may receive multiple power transmission signals, each comprising power transmission waves 607a, from multiple antenna elements of a transmitter 601a; the composite of these power transmission signals may be essentially zero, because in this example, the power transmission waves add together destructively. That is, antenna elements of the transmitter 601a may transmit the exact same power transmission signal (i.e., comprising power transmission waves 607a having the same features, such as phase and amplitude), and as such, when the power transmission waves 607a of the respective power transmission signals arrive at the receiver 605a, they are offset from each other by 180 degrees. Consequently, the power transmission waves 607a of these power transmission signals "cancel" one another. Generally, signals offsetting one another in this way may be referred to as "destructive," and thus result in "destructive interference."

In contrast, as shown in FIG. 6B, for so-called "constructive interference," signals comprising power transmission waves 607b that arrive at the receiver exactly "in phase" with one another, combine to increase the amplitude of the each signal, resulting in a composite that is stronger than each of the constituent signals. In the illustrative example in FIG. 6A, note that the phase of the power transmission waves 607a in the transmit signals are the same at the location of transmission, and then eventually add up destructively at the location of the receiver 605a. In contrast, in FIG. 6B, the phase of the power transmission waves 607b of the transmit signals are adjusted at the location of transmission, such that they arrive at the receiver 605b in phase alignment, and consequently they add constructively. In this illustrative example, there will be a resulting pocket of energy located around the receiver 605b in FIG. 6B; and there will be a transmission null located around receiver in FIG. 6A.

Figure 7:
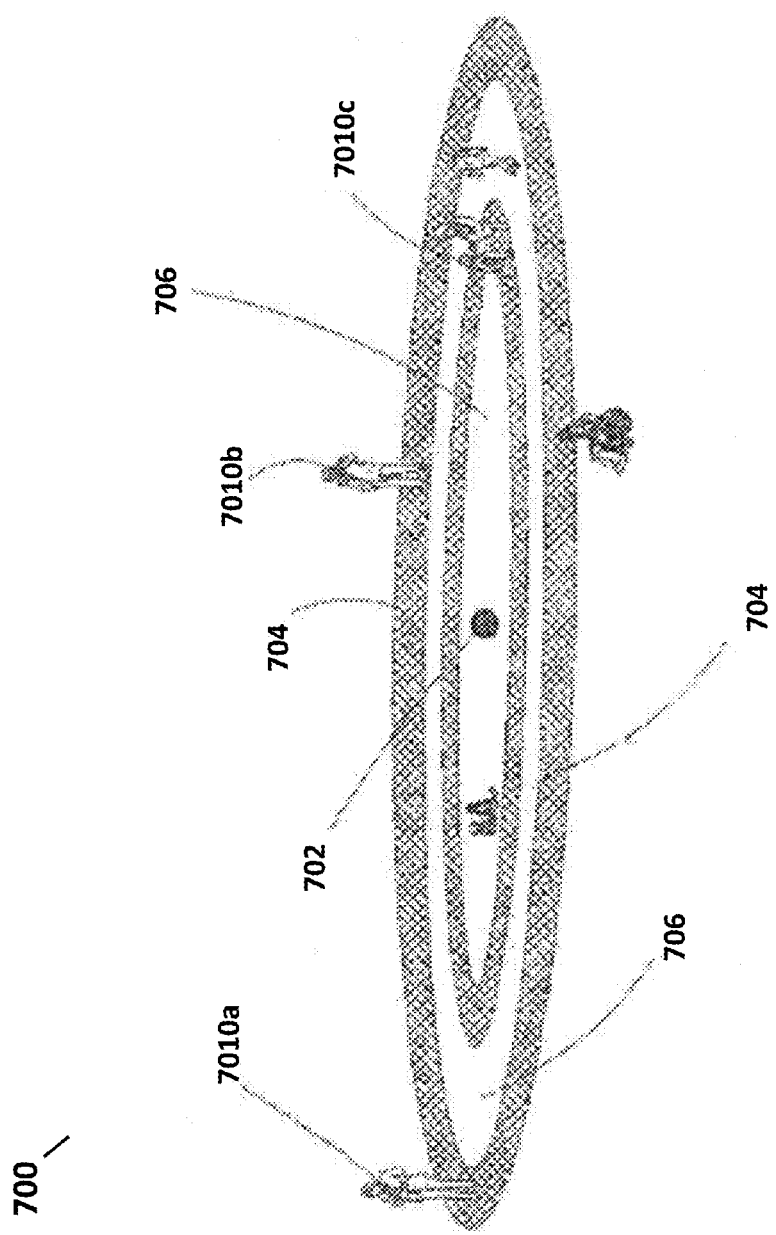
FIG. 7 illustrates wireless power transmission with selective range, where a plurality of pockets of energy may be generated along various radii from transmitter.

FIG. 7 depicts wireless power transmission with selective range 700, where a transmitter 702 may produce pocket-forming for a plurality of receivers associated with electrical devices 701. Transmitter 702 may generate pocket-forming through wireless power transmission with selective range 700, which may include one or more wireless charging radii 704 and one or more radii of a transmission null at a particular physical location 706. A plurality of electronic devices 701 may be charged or powered in wireless charging radii 704. Thus, several spots of energy may be created, such spots may be employed for enabling restrictions for powering and charging electronic devices 701. As an example, the restrictions may include operating specific electronics in a specific or limited spot, contained within wireless charging radii 704. Furthermore, safety restrictions may be implemented by the use of wireless power transmission with selective range 700, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 7, the transmitter 702 may comprise antenna elements found on a different plane than the receivers associated with electrical devices 701 in the served area. For example the receivers of electrical devices 701 may be in a room where a transmitter 702 may be mounted on the ceiling. Selective ranges for establishing pockets of energy using power transmission waves, which may be represented as concentric circles by placing an antenna array of the transmitter 702 on the ceiling or other elevated location, and the transmitter 702 may emit power transmission waves that will generate 'cones' of energy pockets. In some embodiments, the transmitter 701 may control the radius of each charging radii 704, thereby establishing intervals for service area to create pockets of energy that are pointed down to an area at a lower plane, which may adjust the width of the cone through appropriate selection of antenna phase and amplitudes.

Figure 8:
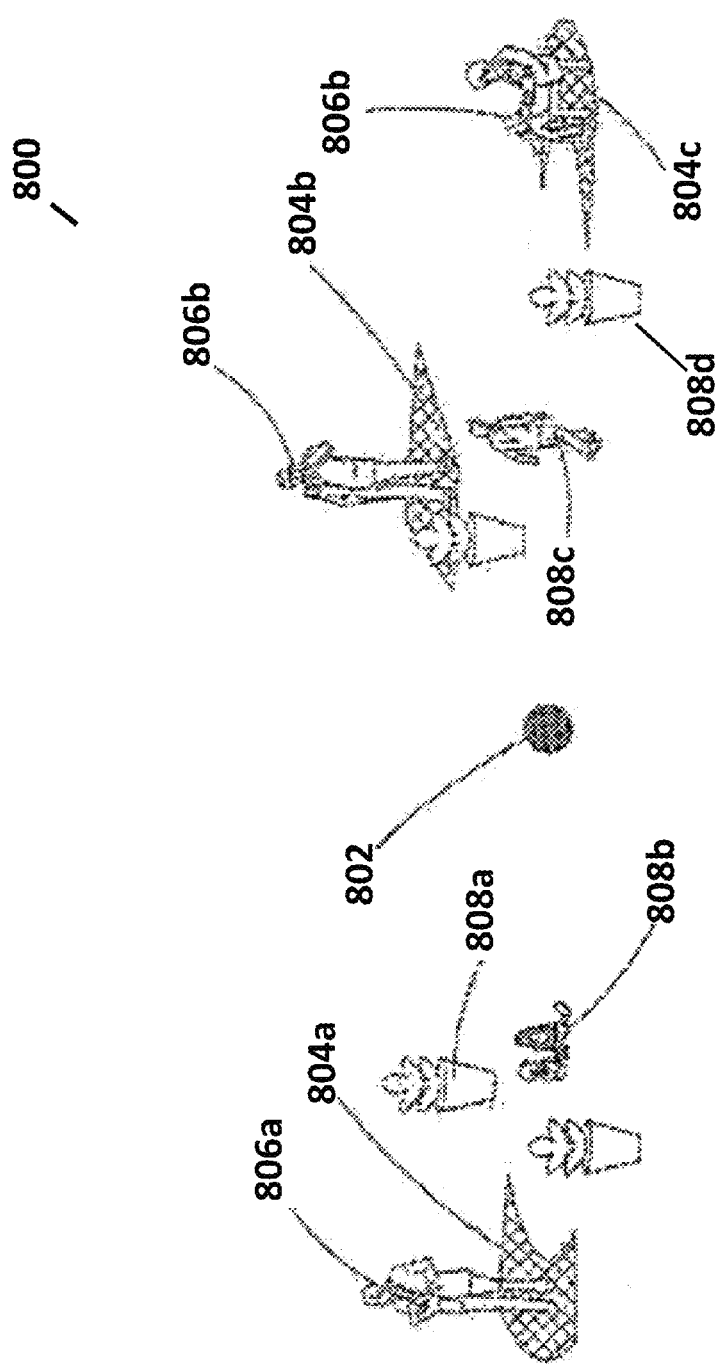
FIG. 8 illustrates wireless power transmission with selective range, where a plurality of pockets of energy may be generated along various radii from transmitter.

FIG. 8 depicts wireless power transmission with selective range 800, where a transmitter 802 may produce pocket-forming for a plurality of receivers 806. Transmitter 802 may generate pocket-forming through wireless power transmission with selective range 800, which may include one or more wireless charging spots 804. A plurality of electronic devices may be charged or powered in wireless charging spots 804. Pockets of energy may be generated over a plurality of receivers 806 regardless the obstacles 804 surrounding them. Pockets of energy may be generated by creating constructive interference, according to the principles described herein, in wireless charging spots 804. Location of pockets of energy may be performed by tacking receivers 806 and by enabling a plurality of communication protocols by a variety of communication systems such as, BLUETOOTH® technology, infrared communication, Wi-Fi, FM radio, among others.

G. Exemplary System Embodiment Using Heat Maps

FIGS. 9A and 9B illustrate a diagram of architecture 900A, 900B for a wirelessly charging client computing platform, according to an exemplary embodiment. In some implementations, a user may be inside a room and may hold on his hands an electronic device (e.g. a smartphone, tablet). In some implementations, electronic device may be on furniture inside the room. The electronic device may include a receiver 920A, 920B either embedded to the electronic device or as a separate adapter connected to electronic device. Receivers 920A, 920B may include all the components described in FIG. 11. A transmitter 902A, 902B may be hanging on one of the walls of the room right behind user. Transmitters 902A, 902B may also include all the components described in FIG. 11.

As user may seem to be obstructing the path between receivers 920A, 920B and transmitters 902A, 902B, RF waves may not be easily aimed to the receivers 920A, 920B in a linear direction. However, since the short signals generated from receivers 920A, 920B may be omni-directional for the type of antenna element used, these signals may bounce over the walls 944A, 944B until they reach transmitters 902A, 902B. A hot spot 944A, 944B may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitter 902A, 902B may scan the room, and look for hot spots 944A, 944B. Once calibration is performed, transmitters 902A, 902B may focus RF waves in a channel following a path that may be the most efficient paths. Subsequently, RF signals 942A, 942B may form a pocket of energy on a first electronic device and another pocket of energy in a second electronic device while avoiding obstacles such as user and furniture.

When scanning the service area, the room in FIGS. 9A and 9B, the transmitter 902A, 902B may employ different methods. As an illustrative example, but without limiting the possible methods that can be used, the transmitter 902A, 902B may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing information related to the signal from the receiver 920A, 920B. Then the transmitter 902A, 902B repeats this calibration periodically. In some implementations, the transmitter 902A, 902B does not have to search through all possible phases, and can search through a set of phases that are more likely to result in strong pockets of energy based on prior calibration values. In yet another illustrative example, the transmitter 902A, 902B may use preset values of transmit phases for the antennas to form pockets of energy directed to different locations in the room. The transmitter may for example scan the physical space in the room from top to bottom and left to right by using preset phase values for antennas in subsequent transmissions. The transmitter 902A, 902B then detects the phase values that result in the strongest pocket of energy around the receiver 920a, 920b by observing the signal from the receiver 920a, 920b. It should be appreciated that there are other possible methods for scanning a service area for heat mapping that may be employed, without deviating from the scope or spirit of the embodiments described herein. The result of a scan, whichever method is used, is a heat-map of the service area (e.g., room, store) from which the transmitter 902A, 902B may identify the hot spots that indicate the best phase and magnitude values to use for transmit antennas in order to maximize the pocket of energy around the receiver.

The transmitters 902A, 902B, may use the Bluetooth connection to determine the location of the receivers 920A, 920B, and may use different non-overlapping parts of the RF band to channel the RF waves to different receivers 920A, 920B. In some implementations, the transmitters 902A, 902B, may conduct a scan of the room to determine the location of the receivers 920A, 920B and forms pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

H. Exemplary System Embodiment

Figure 10A:
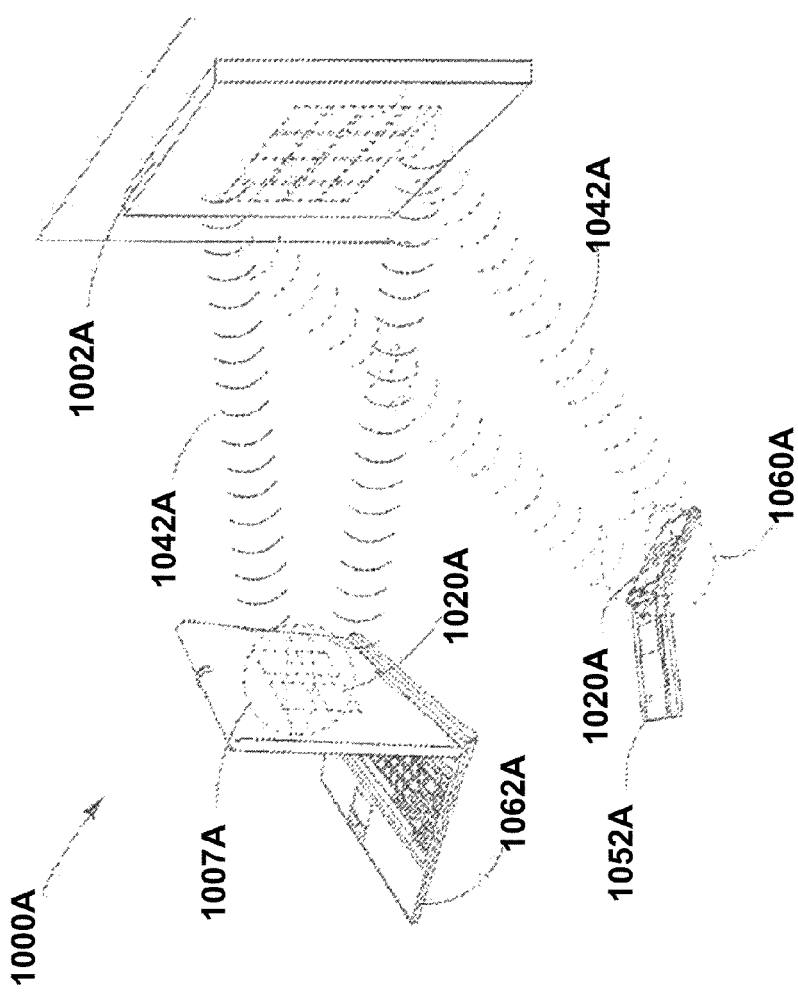
FIG. 10A illustrates wireless power transmission using multiple pocket-forming, according to an exemplary embodiment.

FIG. 10A illustrates wireless power transmission using multiple pocket-forming 1000A that may include one transmitter 1002A and at least two or more receivers 1020A. Receivers 1020A may communicate with transmitters 1002A, which is further described in FIG. 11. Once transmitter 1002A identifies and locates receivers 1020A, a channel or path can be established by knowing the gain and phases coming from receivers 1020A. Transmitter 1002A may start to transmit controlled RF waves 1042A which may converge in three-dimensional space by using a minimum of two antenna elements. These RF waves 1042A may be produced using an external power source and a local oscillator chip using a suitable piezoelectric material. RF waves 1042A may be controlled by RFIC, which may include a proprietary chip for adjusting phase and/or relative magnitudes of RF signals that may serve as inputs for antenna elements to form constructive and destructive interference patterns (pocket-forming). Pocket-forming may take advantage of interference to change the directionality of the antenna elements where constructive interference generates a pocket of energy 1060A and deconstructive interference generates a transmission null. Receivers 1020A may then utilize pocket of energy 1060A produced by pocket-forming for charging or powering an electronic device, for example, a laptop computer 1062A and a smartphone 1052A and thus effectively providing wireless power transmission.

Multiple pocket forming 1000A may be achieved by computing the phase and gain from each antenna of transmitter 1002A to each receiver 1020A. The computation may be calculated independently because multiple paths may be generated by antenna element from transmitter 1002A to antenna element from receivers 1020A.

I. Exemplary System Embodiment

Figure 10B:
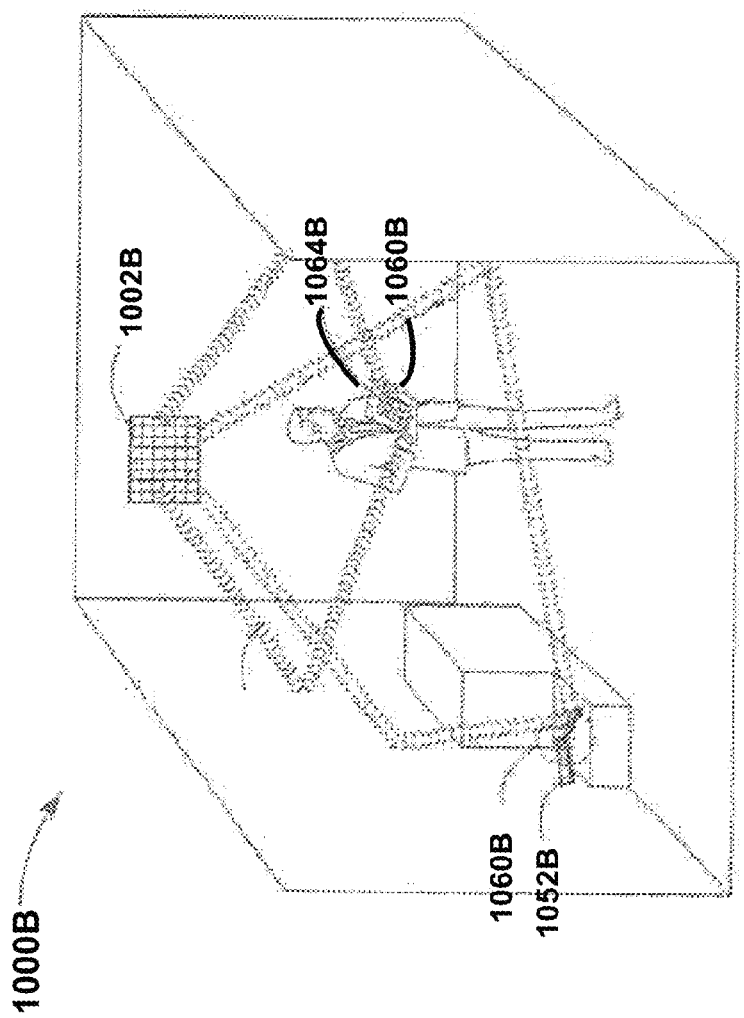
FIG. 10B illustrates multiple adaptive pocket-forming, according to an exemplary embodiment.

FIG. 10B is an exemplary illustration of multiple adaptive pocket-forming 1000B. In this embodiment, a user may be inside a room and may hold on his hands an electronic device, which in this case may be a tablet 1064B. In addition, smartphone 1052B may be on furniture inside the room. Tablet 1064B and smartphone 1052B may each include a receiver either embedded to each electronic device or as a separate adapter connected to tablet 1064B and smartphone 1052B. Receiver may include all the components described in FIG. 11. A transmitter 1002B may be hanging on one of the walls of the room right behind user. Transmitter 1002B may also include all the components described in FIG. 11. As user may seem to be obstructing the path between receiver and transmitter 1002B, RF waves 1042B may not be easily aimed to each receiver in a line of sight fashion. However, since the short signals generated from receivers may be omni-directional for the type of antenna elements used, these signals may bounce over the walls until they find transmitter 1002B. Almost instantly, a micro-controller which may reside in transmitter 1002B, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 1002B may focus RF waves following the most efficient paths. Subsequently, a pocket of energy 1060B may form on tablet 1064B and another pocket of energy 1060B in smartphone 1052B while taking into account obstacles such as user and furniture. The foregoing property may be beneficial in that wireless power transmission using multiple pocket-forming 1000B may inherently be safe as transmission along each pocket of energy is not very strong, and that RF transmissions generally reflect from living tissue and do not penetrate.

Once transmitter 1002B identities and locates receiver, a channel or path can be established by knowing the gain and phases coming from receiver. Transmitter 1002B may start to transmit controlled RF waves 1042B that may converge in three-dimensional space by using a minimum of two antenna elements. These RF waves 1042B may be produced using an external power source and a local oscillator chip using a suitable piezoelectric material. RF waves 1042B may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 1000B may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 1002B. In one embodiment, a single frequency may be transmitted by each antenna in the array. In other embodiments some of the antennas in the array may be used to transmit at a different frequency. For example, ½ of the antennas in the array may operate at 2.4 GHz while the other ½ may operate at 5.8 GHz. In another example, ⅓ of antennas in the array may operate at 900 MHz, another ⅓ may operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8

GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that can be delivered (using pocket-forming) may be a function of the total number of antenna elements 1006 used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in a receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 1002B.

II. Wireless Power Software Management System

Figure 11:
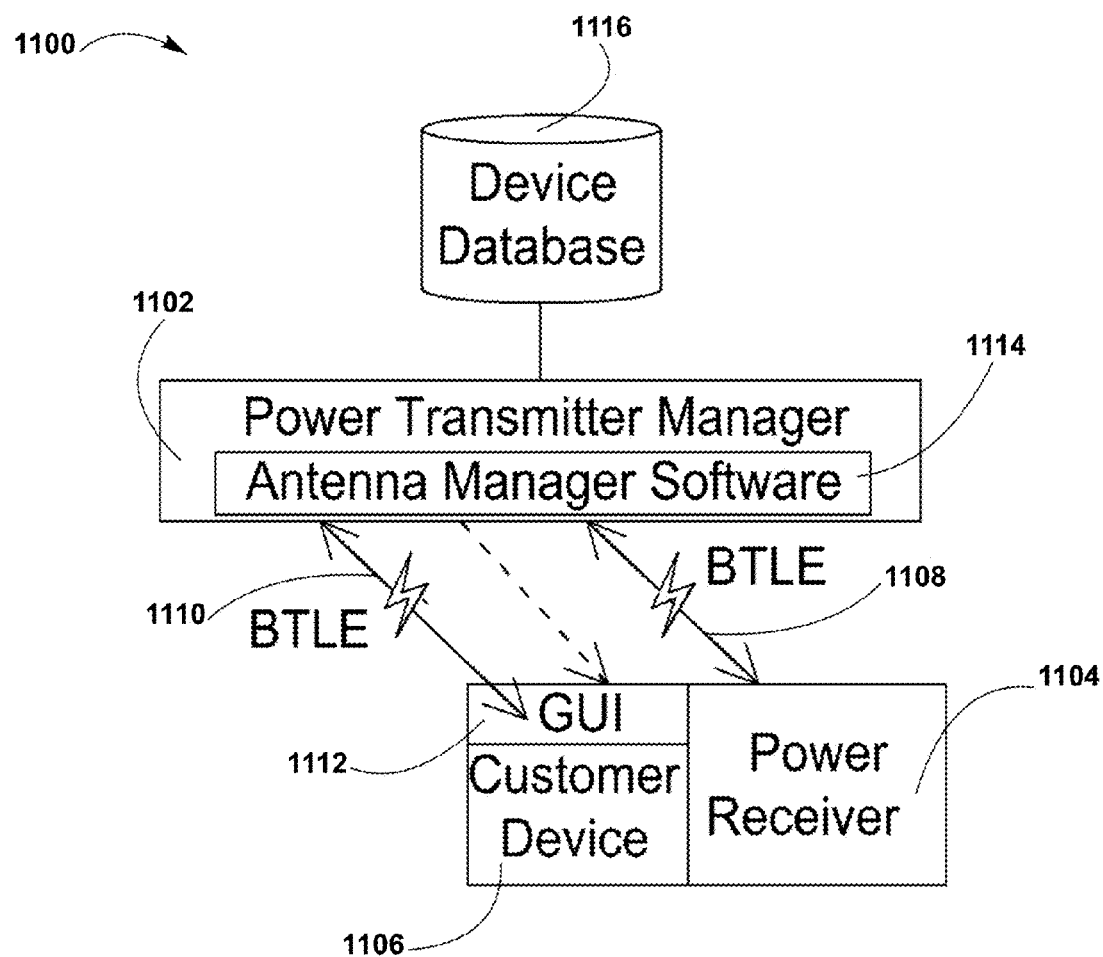
FIG. 11 shows a wireless power system using a wireless power transmitter manager, according to an embodiment.

A. System and Method for Smart Registration of Wireless Power Receivers in a Wireless Power Network FIG. 11 shows a wireless power system 1100 using a wireless power transmitter manager 1102, according to an embodiment. Wireless power transmitter manager 1102 may include a processor with computer-readable medium, such as a random access memory (RAM) (not shown) coupled to the processor. Examples of processor may include a microprocessor, an application specific integrated circuit (ASIC), and field programmable object array (FPOA), among others.

Wireless power transmitter manager 1102 may transmit controlled RF waves that act as power transmission signals that may converge in 3-d space to a wireless power receiver 1104 for charging or powering a customer device 1106. Although the exemplary embodiment recites the use of RF waves as power transmission signals, the power transmission signals may include any number of alternative or additional techniques for transmitting energy to a wireless power receiver converting the transmitted energy to electrical power. These RF waves may be controlled through phase and/or relative amplitude adjustments to form constructive and destructive interference patterns (pocket-forming). Pockets of energy may form at constructive interference patterns and can be 3-dimensional in shape, whereas null-spaces may be present outside the constructive interference patterns.

Wireless power receiver 1104 may be paired with customer device 1106 or may be built into customer device 1106. Examples of customer devices 1106 may include laptop computer, mobile device, smartphones, tablets, music players, and toys, among other. Wireless power transmitter manager 1102 may receive customer device's signal strength from advertisement emitted by wireless power receiver 1104 for the purpose of detecting if wireless power receiver 1104 is nearer to wireless power transmitter manager 1102 than to any other wireless power transmitter manager 1102 in system 1100.

Customer device 1106 may include a graphical user interface 1112 (GUI). Graphical user interface 1112 (GUI) may receive customer device's signal strength from advertisement emitted by wireless power receiver 1104 for the purpose of detecting if wireless power receiver 1104 is paired with graphical user interface 1112 (GUI).

According to some aspects of this embodiment, wireless power transmitter manager 1102 may include a device database 1116, where device database 1116 may store information about all network devices, such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others. Device database 1116 may also stores information about all system devices such as wireless power transmitter managers, wireless power receivers, end user hand-held devices, and servers, among others Under control of wireless power transmitter manager 1102, wireless power system 1100 may send power in a range up to 30 feet.

Wireless power transmitter manager 1102, with control over wireless power receiver's power record, may allow sending power to a specific wireless power receiver 1104. In one embodiment, wireless power transmitter managers 1102 may need to fulfill two conditions to control wireless power receiver's power record in device database 1116; customer device's signal strength threshold has to be significantly greater than 50% (for example 55%) of the signal strength measured by all other wireless power transmitter managers 1102 and has to remain significantly greater than 50% for a minimum amount of time.

Wireless power transmitter manager 1102 may use, but is not limited to, Bluetooth low energy (BLE) to establish a communication link 1108 with wireless power receiver 1104 and a control link 1110 with customer device's graphical user interface (GUI). Wireless power transmitter manager 1102 may use control link 1110 to receive commands from and receive pairing information from customer device's graphical user interface (GUI).

Wireless power transmitter manager 1102 may include antenna manager software 1114 to track customer device 1106. Antenna manager software 1114 may use real time telemetry to read the state of the power received in customer device 1106.

Wireless power transmitter manager 1102 may create a wireless energy area model which includes information about all the movements in the system. This information may be stored in device database 1116.

In other situations, there can be multiple wireless power transmitter managers 2902 and/or multiple wireless power receivers 1104 for powering multiple and various customer devices 1106.

Figure 12:
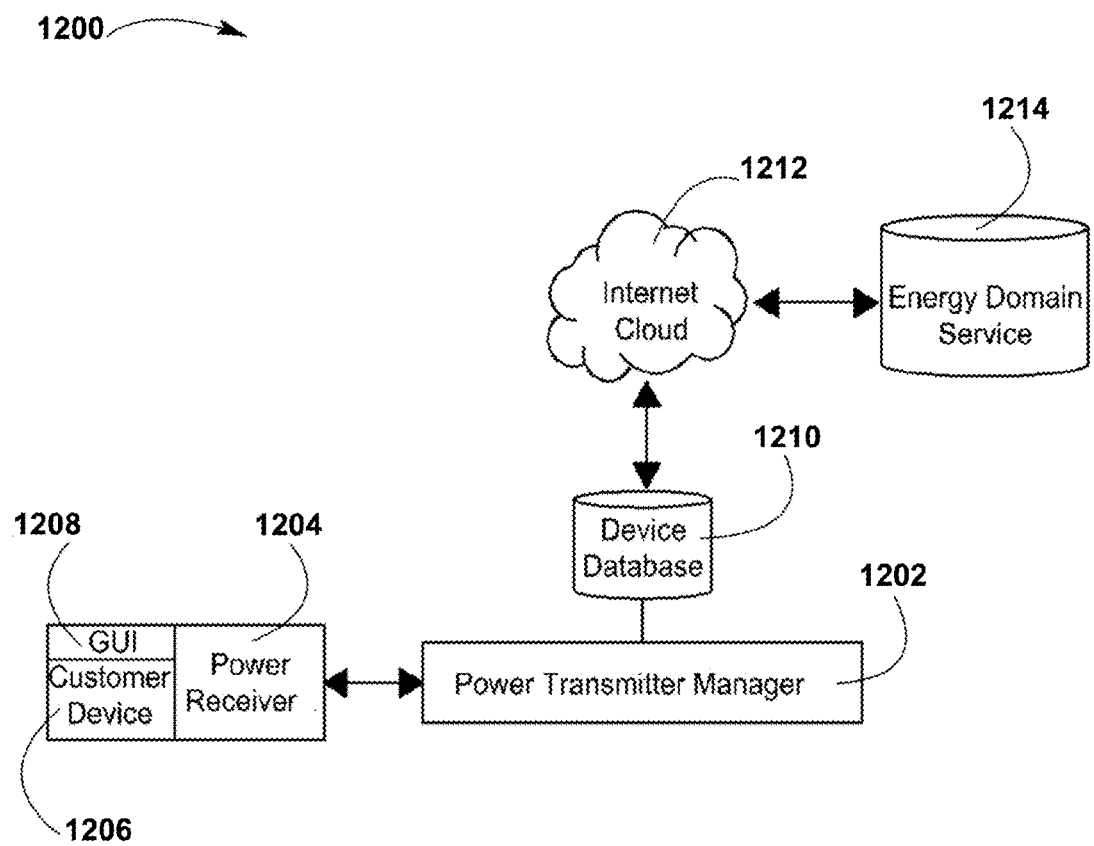
FIG. 12 illustrates a system architecture for smart registration of wireless power receivers within a wireless power network, according to another embodiment.

FIG. 12 illustrates a system architecture for smart registration 1200 of wireless power receivers within a wireless power network, according to another embodiment.

In a wireless power network, one or more wireless power transmitter managers and/or one or more wireless power receivers may be used for powering various customer devices.

Each wireless power device in the wireless power network may include a universally unique identifier (UUID). Examples of wireless power devices may include wireless power transmitter manager, wireless power receiver, end user hand-held or mobile devices, and servers, among others.

A wireless power transmitter manager 1202 may include a processor with computer-readable medium, such as a random access memory (RAM) (not shown) coupled to the processor. Examples of processor may include a microprocessor, an application specific integrated circuit (ASIC), and a field programmable object array (FPOA), among others.

According to some aspects of this embodiment, each wireless power device bought by a customer may be registered at the time of purchase, or registered later by the customer using public accessible web page or smart device application that communicates to energy domain service 1214. The device may registered with the wireless power network, via a registry stored in an energy domain service 1214.

Energy domain service 1214 may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, Pay Pal account, or any other method of payment, address, and wireless power device UUID, among others. The registry may indicate whether wireless power transmitter manager 1202 is for business, commercial, municipal, government, military, or home use. The registry may also include different access policies for each wireless power transmitter manager 1202, depending on it use, for example if wireless power transmitter manager 1202 will be for businesses use, the customer may need to define whether the power transfer will be charged or not.

In a different aspect of this embodiment, a wireless power receiver 1204 may include a nonvolatile memory for storing wireless power transmitter manager 1202 universally unique identifier (UUID). Examples of nonvolatile memory may include read-only memory, flash memory, ferroelectric RAM (F-RAM) hard disks, floppy disks, and optical discs, among others. Wireless power receiver 1204 may be paired with customer device 1206 or may be built into customer device 1206. Examples of customer devices 1206 may include laptop computer, mobile device, smartphone, tablet, music player, and toys, among other. Customer device 1206 may include a graphical user interface 1208 (GUI) as part of wireless power system software downloaded and installed from public application store.

According to some aspects of this embodiment, wireless power transmitter manager 1202 may include a device database 1210, where device database 1210 may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager 1202 may send power in a range up to 30 feet.

According to some aspects of this embodiment, wireless power transmitter manager 1202 may detect customer device's signal strength from advertisement emitted graphical user interface 1208 (GUI) for the purpose of detecting if wireless power receiver 1204 is paired with graphical user interface 1208 (GUI). Wireless power transmitter manager 1202 may also detect if wireless power receiver 1204 is nearer to wireless power transmitter manager 1202 than to any other wireless power transmitter manager 1202 in the wireless power network through an analysis of each device database records in the wireless power system 1200. Each record may include a list of each wireless power receiver 1204 and its signal strength relative to and detected by wireless power transmitter manager 1202. Then wireless power receiver 1204 may be assigned to wireless power transmitter manager 1202, which may have exclusive control and authority to change the wireless power receiver's record in distributed system device database 1210 until wireless power receiver 1204 moves to a new location closer to another wireless power transmitter manager 1202. If wireless power receiver 1204 change to new location closer to another wireless power transmitter manager 1202, then wireless power transmitter manager 1202 (with control over wireless power receiver 1204) may update wireless power receiver's record with its UUID.

If wireless power receiver 1204 tries to charge using wireless power transmitter manager 1202, then wireless power transmitter manager 1202 may verify with energy domain service 1214 if it is authorized to send power to wireless power receiver 1204. Therefore wireless power transmitter manager 1202 may establish a communication connection with wireless power receiver 1204 to request its universally unique identifier (UUID). Wireless power receiver 1204 may send UUID to wireless power transmitter manager 1202. Wireless power transmitter manager 1202 may establish communication connection with energy domain service 1214 and then send its UUID and wireless power receiver 1204 UUID to energy domain service 1214 through an internet cloud 1212, where internet cloud 1212 may be any suitable connections between computers such as, for example, intranets, local area networks (LAN), virtual private networks (VPN), wide area networks (WAN) and the internet among others. Once energy domain service 1214 receives wireless power transmitter UUID and wireless power receiver 1204 UUID, it may inspect the registry for wireless power transmitter manager 1202 using UUID. Registry may include access policy for wireless power transmitter manager 1202. Energy domain service 1214 may determine through the access policy whether wireless power transmitter manager 1202 needs to pay to receive power. If wireless power transmitter manager 1202 access policy states that wireless power receiver 1204 with UUID needs to pay to receive power, energy domain service 1214 may verify whether a credit card, Pay Pal, or other payment method, may be denoted within wireless power receiver 1204 registry. If a payment method is associated with wireless power receiver 1204, energy domain service 1214 may send a message to wireless power transmitter manager 1202 authorizing the power transfer to wireless power receiver 1204. Wireless power transmitter manager 1202 may report energy consumption statistics to energy domain service 1214 for subsequent billing of wireless power receiver's owner. Energy consumption statistics may be stored in device database 1210 and also may be sent to energy domain service 1214 and saved in wireless power receiver's registry.

If no payment method is associated with wireless power receiver 1204, energy domain service 1214 may send a message to wireless power transmitter manager 1202 denying the power transfer to wireless power receiver 1204.

In the case wireless power transmitter manager 1202 access policy states that no charge will be applied to certain wireless power receivers 1204, then energy domain service 1214 may confirm if wireless power receiver 1204 is allowed to receive power from wireless power transmitter manager 1202. If wireless power receiver 1204 is allowed to receive power from wireless power transmitter manager 1202, then, energy domain service 1214 may send a message to wireless power transmitter manager 1202 authorizing the power transfer to wireless power receiver 1204. Otherwise energy domain service 1214 may send a message to wireless power transmitter manager 1202 denying the power transfer to wireless power receiver 1204.

According to some aspect of this embodiment, a customer, may be able to select through a GUI device, which wireless power receivers 1204 may receive charge from wireless power transmitter manager 1202. In the GUI device, customer may be able to visualize each wireless power receiver 1204 near wireless power transmitter manager 1202, then, customer may select which wireless power receivers 1204 are allowed to receive charge from wireless power transmitter manager 1202. This information may be stored in device database 1210 and also may be sent to energy domain service 1214.

In a different aspect of this embodiment, a proprietor or clerk of a commercial or retail business establishment that owns a wireless power system may be able to select through the GUI device a wireless power receiver 1204 to receive power from one or more wireless power transmitter managers 1202 within power range of wireless power receiver 1204. The customer may be provided with a pre-authorized wireless power receiver 1204 at business establishment by proprietor or clerk. The wireless power receiver 1204 may be attached to customer's device. The proprietor or clerks may specify to GUI device the customer's method of payment (credit card, Pay Pal, cash, among others.). Immediately the wireless power transmitter manager 1202 that belong to business establishment may start sending power to the customer device that is attached to pre-authorized wireless power receiver 1204. Customer may be billed on behalf of business establishment for power provided. Also in the GUI device, proprietor or clerk may be able to visualize power received by wireless power receiver 1204 and the amount to bill for power received. This information may be stored in distributed system device database 1210 and also may be sent to energy domain service 1214.

Figure 13:
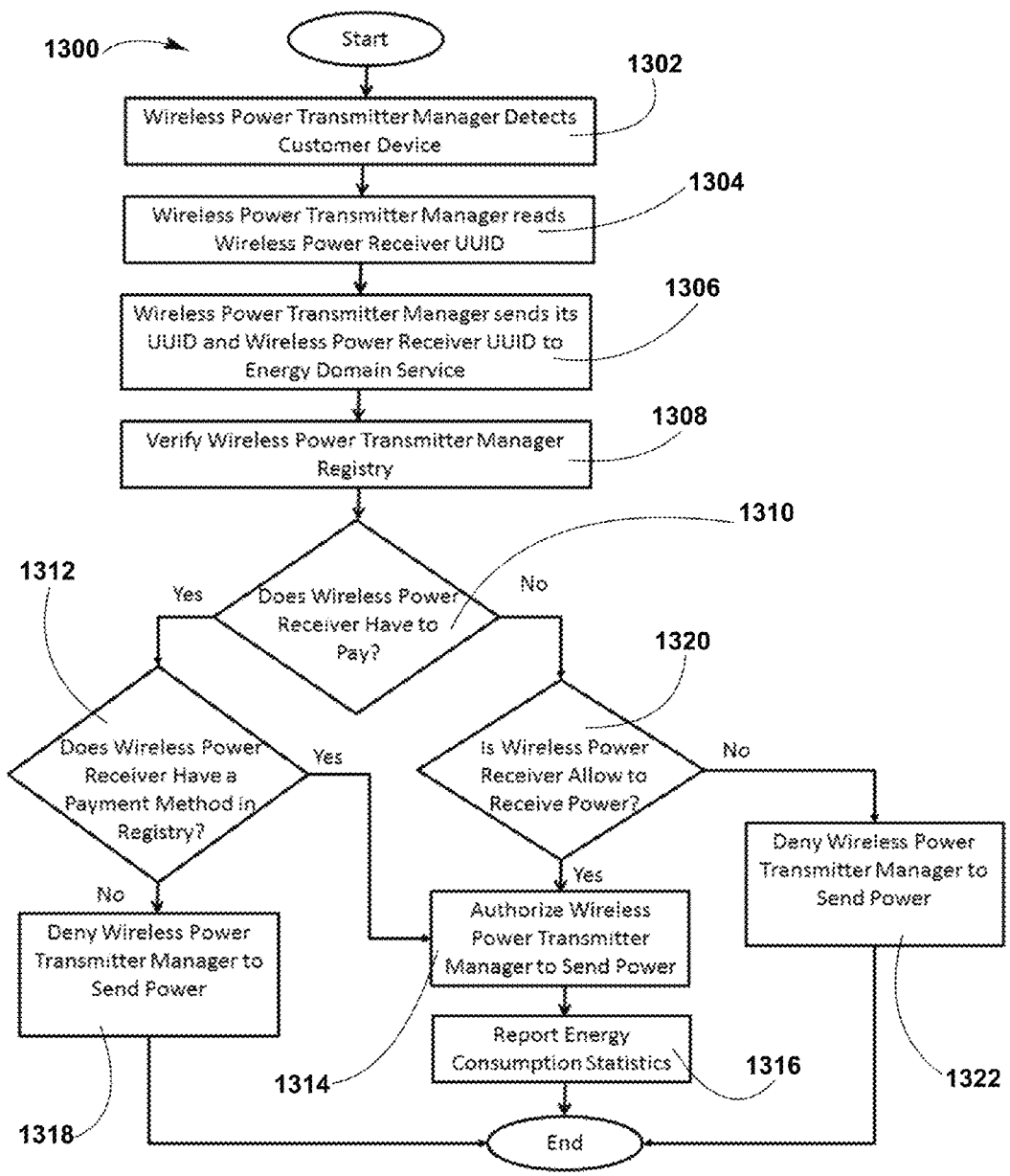
FIG. 13 is a flowchart of a method for smart registration of wireless power receivers within a wireless power network, according to a further embodiment.

FIG. 13 is a flowchart of a method for smart registration 1300 of wireless power receivers within a wireless power network, according to a further embodiment.

In a wireless power network, one or more wireless power transmitter managers and/or one or more wireless power receivers may be used for powering various customer devices. Each wireless power device in the wireless power network may include a universally unique identifier (UUID). Examples of wireless power devices may include wireless power transmitter manager, wireless power receiver, end user hand-held or mobile devices and servers, among others.

The method may start at step 1302 when a wireless power transmitter manager detects a customer device. Customer device may be paired with wireless power receiver or wireless power receiver may be built in a customer device. Example of customer devices may include smartphones, mobile device, tablets, music players, toys and others at the same time. Customer device may include a graphical user interface (GUI) as part of wireless power system software downloaded and installed from public application store.

Wireless power transmitter manager may detect customer device's signal strength from advertisement emitted graphical user interface (GUI) for the purpose of detecting if wireless power receiver is paired with graphical user interface (GUI). Wireless power transmitter manager may also detect if wireless power receiver is nearer to wireless power transmitter manager than to any other wireless power transmitter manager in the wireless power network through an analysis of each device database records in the wireless power system. Each record may include a list of each wireless power receiver and its signal strength relative to and detected by wireless power transmitter manager. Then wireless power receiver may be assigned to wireless power transmitter manager, which may have exclusive control and authority to change the wireless power receiver's record in distributed system device database until wireless power receiver moves to a new location closer to another wireless power transmitter manager.

According to some aspects of this embodiment, Device database may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager may establish a communication connection with wireless power receiver indicating is within range to receive charge. Wireless power transmitter manager may send power in a range up to 30 feet.

If wireless power receiver tries to obtain charge from wireless power transmitter manager, wireless power transmitter manager may verify with energy domain service if it is authorized to send power to wireless power receiver. Therefore wireless power transmitter may establish a communication connection with wireless power receiver to request universally unique identifier (UUID). Wireless power receiver may send UUID to wireless power transmitter manager. Wireless power transmitter manager may read wireless power receiver UUID, at step 1904.

Energy domain service may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, address, and wireless power device UUID, among others. The registry may indicate whether wireless power transmitter manager is for business, commercial, municipal, government, military, or home use. The registry may also include different access policies for each wireless power transmitter manager, depending on it use, for example if wireless power transmitter manager will be for businesses use, the customer may need to define whether the power transfer will be charged or not.

According to some aspects of this embodiment, each wireless power device bought by a customer may be registered at the time of purchase, or registered later by the customer using public accessible web page or smart device application that communicates to energy domain service.

Wireless power transmitter manager may send its UUID and also wireless power receiver UUID to an energy domain service through the internet cloud, at step 1306. Internet cloud may be any suitable connections between computers such as, for example, intranets, local area networks (LAN), virtual private networks (VPN), wide area networks (WAN) and the internet among others.

Energy domain service may inspect the registry for wireless power transmitter manager using UUID, at step 1308. Registry may include access policy for wireless power transmitter manager.

Energy domain service may determine through the access policy whether wireless power transmitter manager needs to pay to receive power, at step 1310.

If wireless power transmitter manager access policy states that wireless power receiver with UUID needs to pay to receive power, energy domain service may verify whether a credit card, Pay Pal, or other payment method, may be denoted within wireless power receiver registry, at step 1312.

If a payment method is associated with wireless power receiver registry, energy domain service may send a message to wireless power transmitter manager authorizing the power transfer to wireless power receiver, at step 1314.

Wireless power transmitter manager may report energy consumption statistics to energy domain service for subsequent billing of wireless power receiver's owner, at step 1316. Energy consumption statistics may be stored in device database and also may be sent to energy domain service and saved in wireless power receiver's registry.

In the case no payment method is associated with wireless power receiver, energy domain service may send a message to wireless power transmitter manager denying the power transfer to wireless power receiver, at step 1318.

Else, if wireless power transmitter manager access policy states that no charge will be applied to a certain wireless power receiver which may be trying to obtain power from wireless power transmitter manager, energy domain service may confirm whether wireless power receiver is allowed to receive power from wireless power transmitter manager, at step 1320.

If wireless power receiver is allowed to receive power from wireless power transmitter manager. Energy domain service may send a message to wireless power transmitter manager authorizing the power transfer to wireless power receiver, at step 1314.

Wireless power transmitter manager may report energy consumption statistics to energy domain service, at step 1316. Energy consumption statistics may be stored in device database and also may be sent to energy domain service and saved in wireless power receiver's registry.

Otherwise if wireless power receiver is not allowed to receive power from the wireless power transmitter, energy domain service may send a message to wireless power transmitter manager denying the power transfer to wireless power receiver, at step 1322.

According to some aspect of this embodiment, a customer may be able to select through a GUI device which wireless power receivers may receive charge from wireless power transmitter manager. In the GUI device, customer may be able to visualize each wireless power receiver near to wireless power transmitter manager, then customer may select which wireless power receivers are allowed to receive charge from wireless power transmitter manager. This information may be stored in device database and also may be sent to energy domain service.

EXAMPLES

Example #1 is a wireless power network with components similar to those described in FIG. 12. A customer may have a wireless power transmitter manager in his/her house. The customer invites three friends to watch a football game. Two of the three friends have a wireless power receiver cover paired with their cellphones. When both wireless power receivers are within the range of the wireless power transmitter manager, they may receive a message from wireless power transmitter manager indicating they are within range to receive power. One of the wireless power receivers may try to obtain power from wireless power transmitter manager, but first the wireless power transmitter manager may verify whether wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that no charge will be applied for using wireless power transmitter manager and that any wireless power receiver is able to receive charge from it. Energy domain service may verify wireless power receiver registry and then energy domain service may authorize wireless power transmitter manager to send power to wireless power receiver.

Example #2 is a wireless power network with components similar to those described in FIG. 12. A restaurant may have a wireless power transmitter manager. A customer within the restaurant has a cellphone with a wireless power receiver cover. The customer may want to charge his/her cellphone while having dinner. The customer tries to charge his/her cellphone using wireless power transmitter manager, the wireless power transmitter manager may need to verify if wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that a charge will be applied for using wireless power transmitter manager. Then, energy domain service may verify wireless power register to determine whether a method of payment such as credit card or other method is associated with wireless power receiver. If a payment method is on the registry file, energy domain service may authorize wireless power transmitter manager to send power to wireless power receiver. Wireless power transmitter manager may track the amount of power sent to wireless power receiver. This information may be stored in device database and also may be sent to energy domain service to generate a bill, on behalf of the restaurant.

III. Managing Power Transfer from Multiple Transmitters

Figure 14:
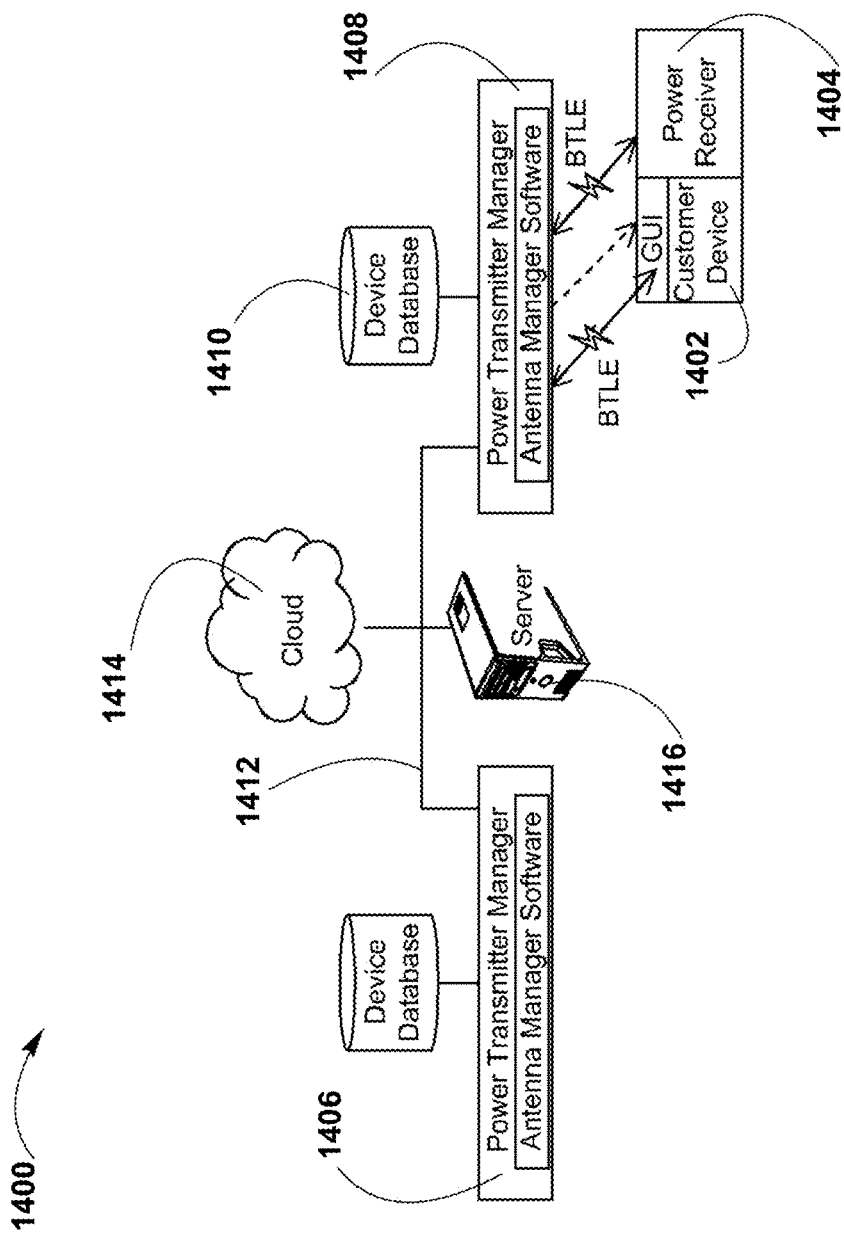
FIG. 14 illustrates a transmitter communications transition, between one wireless power transmitter manager to another, in a wireless power transmission system, according to an embodiment.

A. System and Method for Controlling Communication Between Wireless Power Transmitter Managers FIG. 14 illustrates a transmitter communications transition 1400; as used herein transmitter communications transition refers to transition of communications with a wireless power receiver, between one wireless power transmitter to another wireless power transmitter in a wireless power transmission system, according to an embodiment. The communications involved in a transmitter communications transition may include one or more of one way communications, two way communications, and wireless transfer of power. In one embodiment, transmitter communications transition refers specifically to a transition of communications with a wireless power receiver, between one wireless power transmitter manager to another wireless power transmitter manager.

In a wireless power transmission system, multiple wireless power transmitter managers and/or multiple wireless power receivers may be used for powering various customer devices 1402. A wireless power receiver 1404 may be paired with customer device 1402 or may be built into customer device 1402. Example of customer devices 1402 may include smartphones, tablets, music players, toys and others at the same time. Customer device 1402 may include a graphical user interface (GUI)

Each wireless power transmitter manager in the wireless power transmission system may receive customer device's signal strength from ads emitted by wireless power receiver 1404 and graphical user interface (GUI).

Each wireless power transmitter manager in the wireless power transmission system may include a device database 1410. Device database 1410 may store customer device's power schedules, customer device's status, names, customer's sign names, and details running the system, among others, for each customer device 1402 in the wireless power transmission system near to a wireless power transmitter manager. Device database 1410 may also stores information about all system devices such as wireless power transmitter managers, wireless power receivers, end user hand-held devices, and servers, among others.

A Wi-Fi connection 1412 may be established between a wireless power transmitter manager one 1406 and a wireless power transmitter manager two 1408 to share between system devices: device database's power records, quality control information, statistics, and problem reports, among others Each wireless power transmitter manager may create a wireless energy area model which includes information about all the movements in the system. Also this information may be stored at device database 1410. Wireless energy area model may be used in transmitter communications transitions, i.e. in transitioning communications and power transfer from wireless power transmitter manager one 1406 to wireless power transmitter manager two 1408. For example if a customer device 1402 moves away from wireless power transmitter manager one 1406 and nearer to wireless power transmitter manager two 1408, this movement may be registered in the wireless energy area model.

In another aspect of this embodiment, wireless power transmitter managers may transfer power in a range between 15 feet to 30 feet, but only wireless power transmitter manager with control over wireless power receiver's power record, may be allowed sending power to a specific wireless power receiver. Furthermore wireless power transmitter managers may share wireless power receiver's power record, but only the wireless power transmitter manager, with control over wireless power receiver's power record, can change the information stored for that power record in the device database 1410.

According to some aspects of this embodiment, wireless power transmitter managers may need to fulfill two conditions to control power transfer over a customer device; customer device's signal strength threshold has to be significantly greater than a predetermined percentage of the signal strength measured by all the other wireless power transmitter managers for a minimum amount of time. For example, in the case of a predetermined percentage of 50%, the signal strength threshold has to be greater than 55%. If multiple wireless power transmitter managers are within range to communicate with and transfer power to a given wireless power receiver, then only the closest wireless power transmitter manager or the last wireless power transmitter manager closest to wireless power receiver, has control of the wireless power receiver's power record in device database 1410, however each wireless power transmitter manager may individually and simultaneously transfer power to the power record. In this case, communication with the wireless power receiver is time-phased (shared) between the multiple wireless power transmitter managers so that each can track the 3-D location of the wireless power receiver, in case it is in movement.

In another aspect of this embodiment, wireless power transmitter manager one 1406 and wireless power transmitter manager two 1408 may share customer device's information through a cloud 1414. Both wireless power transmitter managers may be connected to cloud 1414 through network connections (not shown in FIG. 14). Network connections may refer to any suitable connections between computers such as, for example, intranets, local area networks (LAN), virtual private networks (VPN), wireless area networks (WAN) and the internet among others. Cloud 1414 may also be used to share between system devices: quality control information, statistics, and problem reports, among others.

According to some aspects of this embodiment, a server 1416 may be connected to cloud 1414 as a backup of device database 1410 shared by every wireless power transmitter manager in the wireless power transmission system.

Figure 15:
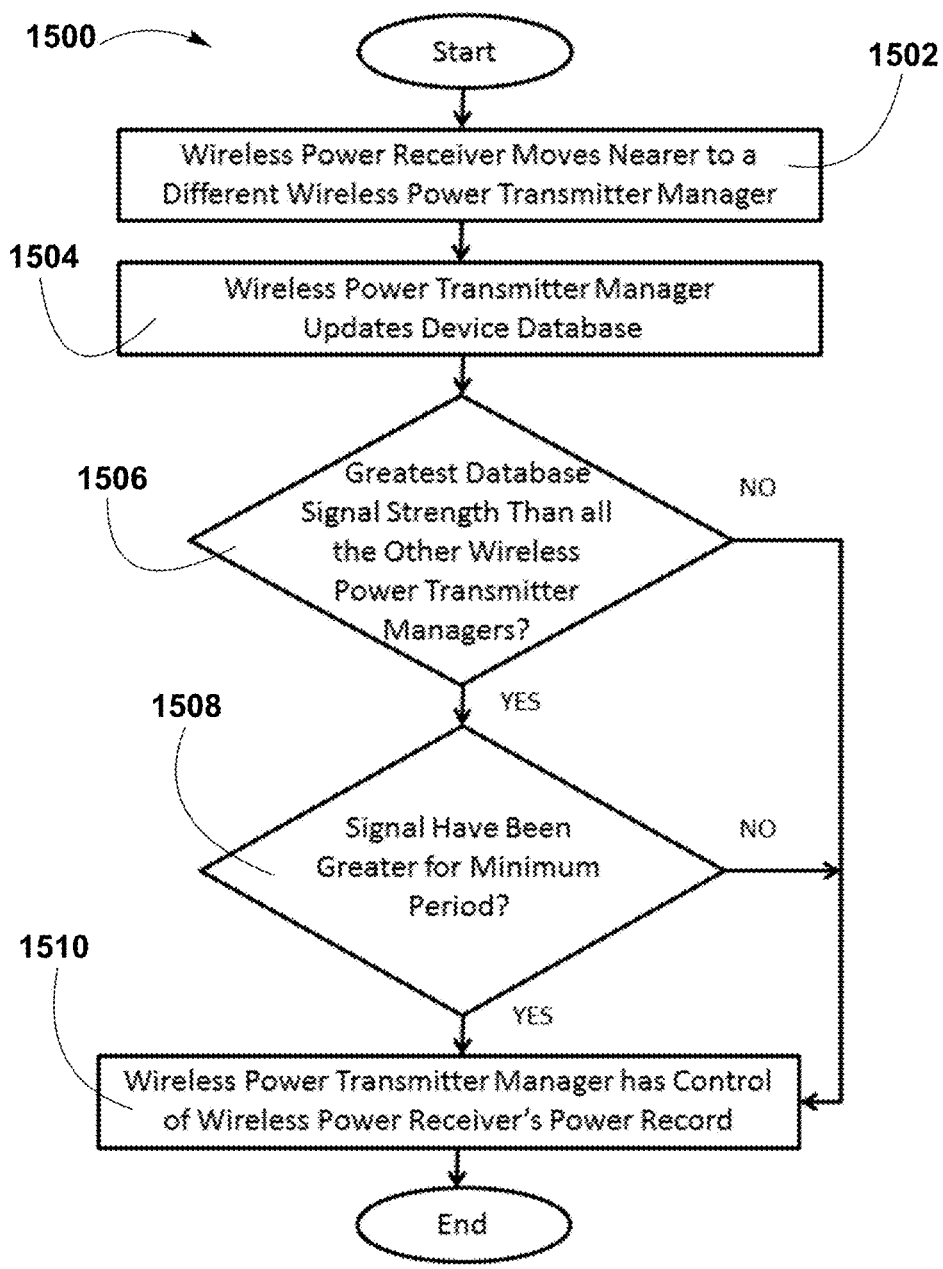
FIG. 15 is a flowchart of transmitter communications transition, between one wireless power transmitter manager to another, in a wireless power transmission system, according to an embodiment.

FIG. 15 is a flowchart 1500 of a transmitter communications transition, between one wireless power transmitter manager to another, in a wireless power transmission system, according to an embodiment.

In a wireless power transmission system with two wireless power transmitter managers the process may start when a wireless power receiver moves away from a wireless power transmitter manager and nearer to another, at step 1502. A customer device may be paired with the wireless power receiver. Example of customer devices may include smartphones, tablets, music players, and toys, among others. Customer device may include a graphical user interface (GUI).

Wireless power transmitter managers may receive customer device's signal strength from ads emitted by wireless power receiver and graphical user interface (GUI).

Subsequently, both wireless power transmitter managers may update a device database with the customer device's signal strength measured by each transmitter manager, at step 1504.

Each wireless power transmitter manager in the wireless power transmission system may include a device database. Device database may store customer device's power schedules, customer device's status, names, customer's sign names, and details running the system, among others, for each customer device in the power transmission system near to a given wireless power transmitter manager. Device database also may store information about all system devices such as wireless power transmitter managers, wireless power receivers, end user hand-held devices, and servers, among others.

According to some aspects of this embodiment, only the wireless power transmitter manager with control over wireless power receiver's power record, may be allowed sending power to a specific wireless power receiver. Also wireless power transmitter managers in the system may share wireless power receiver's power records but only the wireless power transmitter manager with control over wireless power receiver's power record, can change the information stored for that power record in the device database.

Both wireless power transmitter managers may decide which one of them first receives the strongest signal strength from customer device, at step 1506.

According to some aspects of this embodiment, wireless power transmitter managers may need to fulfill two conditions to control power transfer over a customer device; customer device's signal strength threshold has to be significantly greater than a predetermined percentage of the signal strength measured by all the other wireless power transmitter managers for a minimum amount of time. For example, in the case of a predetermined percentage of 50%, the signal strength threshold has to be greater than 55%. If multiple wireless power transmitter managers are within range to communicate with and transfer power to a given wireless power receiver, then only the closest wireless power transmitter manager or the last wireless power transmitter manager closest to wireless power receiver, has control of the wireless power receiver's power record in the device database, however each wireless power transmitter manager may individually and simultaneously transfer power to the power record. In this case, communication with the wireless power receiver is time-phased (shared) between the multiple wireless power transmitter managers so that each can track the 3-D location of the wireless power receiver, in case it is in movement.

The wireless power transmitter manager that first receives the strongest signal strength from customer device, it may verify if the signal strength of customer device has been significantly greater than predetermined percentage (for example greater than 55%, for a predetermined percentage of 50%) for a minimum amount of time, at step 1508.

The wireless power transmitter manager that first receives the strongest signal strength from customer device for a minimum amount of time may take control of wireless power receiver's power records and power transfer, at step 1510.

Figure 16:
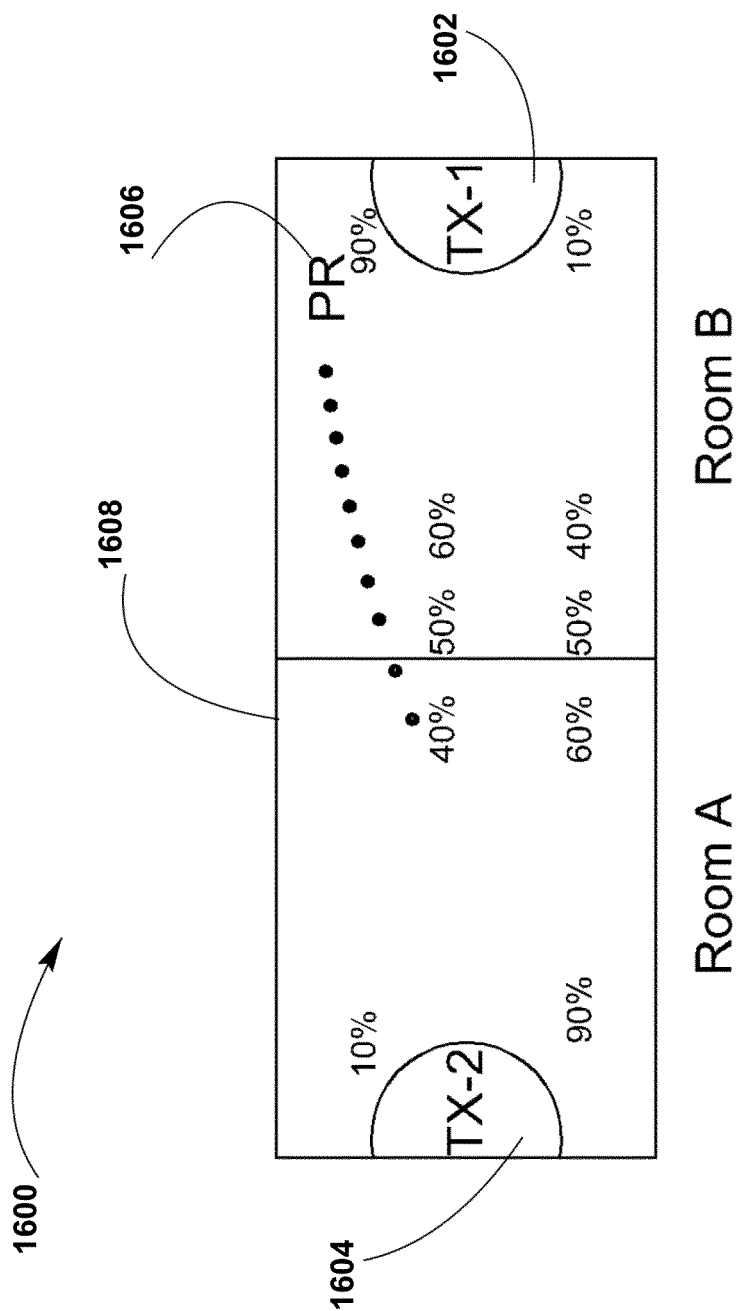
FIG. 16 is an exemplary embodiment of transmitter communications transition, between one wireless power transmitter manager to another, in a wireless power transmission system, according to an embodiment.

FIG. 16 is an exemplary embodiment 1600 of a transmitter communications transition, between one wireless power transmitter manager to another, in a wireless power transmission system, according to an embodiment.

In a wireless power transmission system 1608, multiple wireless power transmitter managers and/or multiple wireless power receivers may be used for powering various customer devices.

As an exemplary embodiment 1600, two wireless power transmitter managers may be in different rooms. Wireless power transmitter manager one 1602 may be located in room B and wireless power transmitter manager two 1604 may be located in room A. Room A and B may be next to each other.

Wireless power receiver 1606 may be located in room B and may receive power transfer from wireless power transmitter manager one 1602. A customer device may be paired with a wireless power receiver 1606. Example of customer devices may include smartphones, tablets, music players, toys and others at the same time. Customer device may include a graphical user interface (GUI).

Each wireless power transmitter manager near to customer device may receive customer device's signal strength from ads emitted by wireless power receiver 1606 and graphical user interface (GUI).

Each wireless power transmitter manager in the power transmission system 1608 may have a device database. Device database may store customer device's power schedules, customer device's status, names, customer sign names, and details running the system, among others, for each customer device in the power transmission system 1608 near to any wireless power transmitter manager. Device database also may store information about all system devices such as wireless power transmitter managers, wireless power receivers, end user hand-held devices, and servers, among others.

Each wireless power transmitter manager may create a wireless energy area model which includes information about all the movements in the system. This information may be used to effect a transmitter communications transition involving control of power transfer from wireless power transmitter manager one 1602 to wireless power transmitter manager two 1604. Wireless energy area model may be stored in the corresponding device database for each wireless power transmitter manager.

If wireless power receiver 1606 starts moving from room B to room A, wireless power transmitter manager one 1602 may take control over power transfer for wireless power receiver 1606 and wireless power transmitter's power records if customer device's signal strength threshold is significantly greater than 50% of the signal strength measured by all other wireless power transmitter managers. For example if wireless power transmitter manager one 1602 receives 90% signal strength from customer device, wireless power transmitter manager one 1602 may still have control over power transfer and wireless power receiver's power records.

If wireless power receiver 1606 continues moving toward room A, but wireless power transmitter manager one 1602 receives 60% signal strength from customer device, wireless power transmitter manager one 1602 may still have control over power transfer and wireless power receiver's power records.

Wireless power receiver 1606 may move until mid-way between room A and room B. If wireless power transmitter manager one 1602 and wireless power transmitter manager two 1604 receives 50% signal strength from customer device, wireless power transmitter manager one 1602 may still have control over power transfer and wireless power receiver's power records.

Wireless power receiver 1606 continues moving towards room A. If wireless power transmitter manager one 1602 may receive 40% or 45% signal strength from customer device and wireless power transmitter manager two 1604 may receive 55% or 60% signal strength from customer device for a minimum amount of time, wireless power transmitter manager one 1602 may effect a transmitter communications transition, transferring control of power transfer, and may provide wireless power receiver's power record to wireless power transmitter manager two 1604. Wireless power transmitter manager two 1604 may take control over power transfer and wireless receiver power's power record.

If wireless power receiver 1606 moves back from room A to room B, wireless power transmitter manager two 1604 may have control over power transfer for wireless power receiver 1606 until signal strength drops to 45% or less for a minimum amount of time. Wireless power transmitter manager one 1602 may take control over power transfer until customer device's signal strength reaches 55% or more for a minimum amount of time.

EXAMPLES

Example #1 is an application of the system described in FIG. 14. First wireless power transmitter manager may be located in a living room and a second wireless power transmitter manager may be located in a bedroom. A customer may be watching television in the living room, and at the same time the customer may be charging his cellphone using the wireless power transmitter manager located in the living room. The customer's cellphone may be paired with a wireless power receiver. Wireless power transmitter manager located in the living room and wireless power transmitter manager located in the bedroom may receive customer cellphone's signal strength from ads emitted by wireless power receiver and cellphone's graphical user interface (GUI). The customer may go to sleep and may take his cellphone with him; the customer's cellphone may continue charging using the wireless power transmitter manager located in the living room until his/her cellphone's signal strength drops to 45% or less. When the cellphone's signal strength drops to 45% or less for wireless power transmitter manager located in the living room, wireless power transmitter manager located in the bedroom may take control over power transfer without power transfer interruption, after it receives 55% or more signal strength for a minimum amount of time. Customer cellphone may continue charging using wireless power transmitter manager located in the bedroom. A transmitter communications transition between wireless power transmitter managers located in the living room and wireless power transmitter manager located in the bedroom may not be noticed by customer.

B. Cluster Management of Transmitters

The wireless power management system provides cluster management of a plurality or cluster of transmitters at a location, facilitating the transfer of power from two or more transmitters in the cluster of transmitters to a power receiver. In cluster management of a plurality of transmitters, transmitter communications transition refers to transition of communications with a wireless power receiver between one wireless power transmitter to another wireless power transmitter in the plurality or cluster of transmitters. The communications involved in a transmitter communications transition may include one or more of one way communications, two way communications, and wireless transfer of power. In one embodiment, transmitter communications transition refers specifically to a transition of communications with a wireless power receiver, between one wireless power transmitter manager to another wireless power transmitter manager of the plurality or cluster of transmitters. In an embodiment, transmitter communications transitions occur as a mobile device associated with a power receiver moves to, from, or within the transmitter cluster location.

In an exemplary transmitter and receiver embodiment, a receiver is embedded in or otherwise joined to a device such as a mobile phone. In the embodiment described below, status communications between transmitter and receiver are hosted using the Bluetooth Low Energy (BLE) wireless communications protocol. BLE is exemplary of a broad range of wireless communications protocols that are capable of hosting status communications between the transmitters and receivers (for example, Wi-Fi (IEEE 23A02.11), Near Field Communication (NFC), radio frequency identification (RFID), iBeacon), and the present transmitter cluster management method is not limited to a particular status communication protocol. The transmitter and receiver each has a Bluetooth low energy (BLE) processor. In use, the transmitter's BLE processor scans for Bluetooth devices. When the receiver's Bluetooth processor powers up, it begins advertising that it is a Bluetooth device. The advertisement includes a unique identifier so that when the transmitter scans the advertisement, it will distinguish that receiver's advertisement from all other Bluetooth devices in range. In response to this identification, the transmitter immediately forms a communication connection with the receiver and will command the receiver.

After forming the BLE communication connection between transmitter and receiver, the transmitter commences sending power transfer signals to the receiver (for example, at a rate of 3400 times a second), and the receiver sends voltage sample measurements back to the transmitter. The transmitter analyzes these voltage measurements while varying the configuration of the transmitter antennas in phase and gain, until achieving a maximum voltage level. At this level, there is maximum energy in the pocket around the receiver. The wireless power transfer management system continually receives status and usage data from the transmitter, and through the transmitter, obtains status and usage information from the receiver), as with all other transmitters and receivers in the system. For example, as applied to energy harvest, the receiver communicates the updated energy harvest value to the transmitter, once a second. The transmitter accumulates data such as energy harvest values from the receiver, and from any other receiver with which it communicates. Periodically, the transmitter uploads accumulated energy information to the wireless power management system.

The present transmitter cluster management method addresses situations in which a plurality or cluster of transmitters provides power to a given receiver at a location using pocket-forming. Two or more transmitters each may execute a procedure for pocket-forming at the given receiver, as multiple pockets formed at the receiver by the two or more transmitters generally would improve power transfer efficiency or control for that receiver.

In transferring power to a given receiver with a plurality of transmitters, each transmitter will execute the same general communication procedure that applies to power transfers between a single transmitter and receiver. After forming a BLE communication connection between the respective transmitter and receiver, the transmitter begins sending power transfer signals to the receiver (e.g. 3400 times a second), and the receiver sends voltage sample measurements back to the transmitter. Each of the plurality of transmitters would analyze these voltage measurements while varying the configuration of the transmitter antennas in phase and gain, until achieving a maximum voltage level. At this level, there is maximum energy in the pocket formed by that respective transmitter around the receiver. Each transmitter that is executing power transfers to the receiver will periodically communicate accumulated energy information for the receiver, and other status and usage information, to the wireless power management system.

Figure 17:
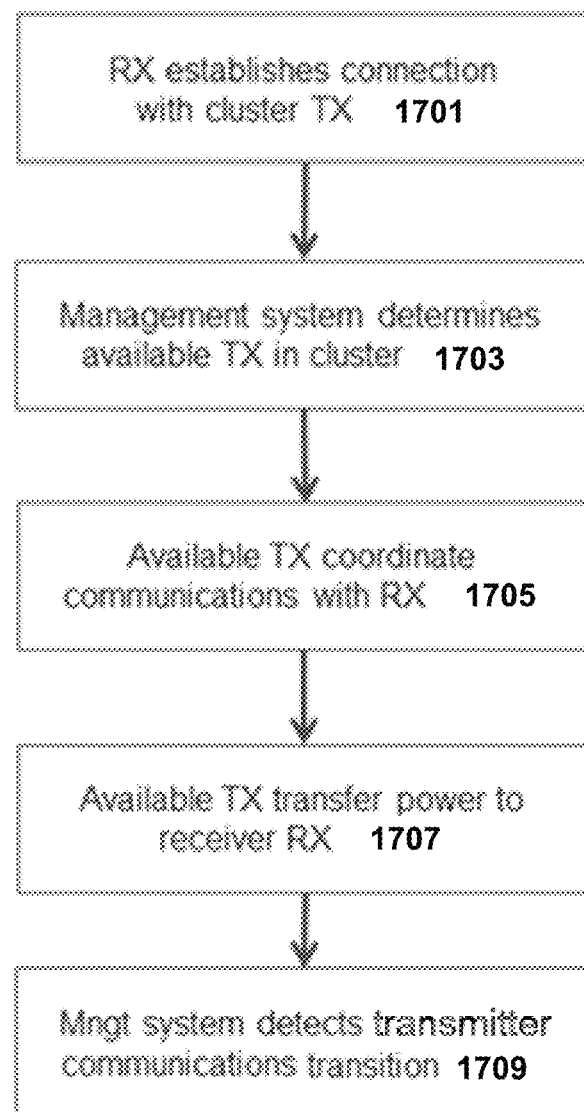
FIG. 17 is a flowchart of a method for managing communications within a cluster of wireless power transmitters, and for managing wireless power transmission of the cluster with a wireless power receiver, according to an embodiment.

FIG. 17 illustrates steps of cluster management of a plurality or cluster of transmitters TX at a location, to facilitate power transfer to a receiver RX. In the initial step 1701, receiver RX establishes communications with a transmitter TX within the cluster. Upon establishing communications with receiver RX, the transmitter TX communicates the unique identifier of the newly identified power receiver RX to the wireless power management system. In one embodiment transmitter TX is a master transmitter that has been designated to manage communications for the cluster of transmitters. At step 1703, the wireless power management system determines which transmitters within the cluster at that location are available to transfer power to receiver RX.

In one embodiment, the available transmitters TX will include any transmitter within the cluster capable of transferring power to receiver RX, including the transmitter of step 1701 and any other TX within range of the receiver as reported to the management system. One or more wireless power transmitters may automatically transmit power to any single wireless power receiver that is close enough for it to establish a communication connection using a suitable communication technology, including Bluetooth Low Energy or the like. The wireless power receiver may then power or charge an electrically connected client device.

However this may not be the case at some locations with a cluster of transmitters. The system can be configured by the wireless power management system to transmit power only to specific wireless power receivers depending on specific system criteria or conditions, such as the time or hour of the day for automatic time-based scheduled power transmission, wireless power receiver physical location, owner of client device, or other suitable conditions and/or criteria. For example, a transmitter TX of the cluster of transmitters may be dedicated to powering one or more device of a particular user, wherein other devices and receivers are not authorized to receive power from that transmitter. In the following discussion, references to available transmitters or to transmitters available to a given receiver mean transmitters that are within power transfer range of that receiver, and that can be used to transfer power to that receiver based upon all other considerations, such as any limitation on transmitter use in specific system criteria or conditions recorded in the wireless power management system.

At step 1705, it is assumed that two or more transmitters TX are available to transfer power to receiver RX. At this step, the two or more transmitters coordinate communications with receiver RX in an embodiment (such as BLUETOOTH® communications) in which only one transmitter TX can communicate with receiver RX at a time. In one embodiment as explained below, communications are coordinated by one of the two or more transmitters which is selected as a master transmitter. At step 1707, the available transmitters TX transfer power to receiver RX, subject to the coordination of communications at step 1705. At step 1709, the management system detects a transmitter communications transition within the cluster of transmitters that are in communication with receiver RX. This transmitter communications transition may involve one of the available transmitters ceasing its communications with receiver RX (e.g. due to receiver RX moving out of range of that transmitter); a new transmitter TX establishing communications with receiver RX; or a combination of these occurrences. Typically in this event, unless the transmitter communications transition entails the end of all connections of receiver RX with transmitters in the cluster, the power transfer management system and the transmitter(s) available after the transition will repeat steps 1703 through 1709 of this cluster management method.

Figure 18:
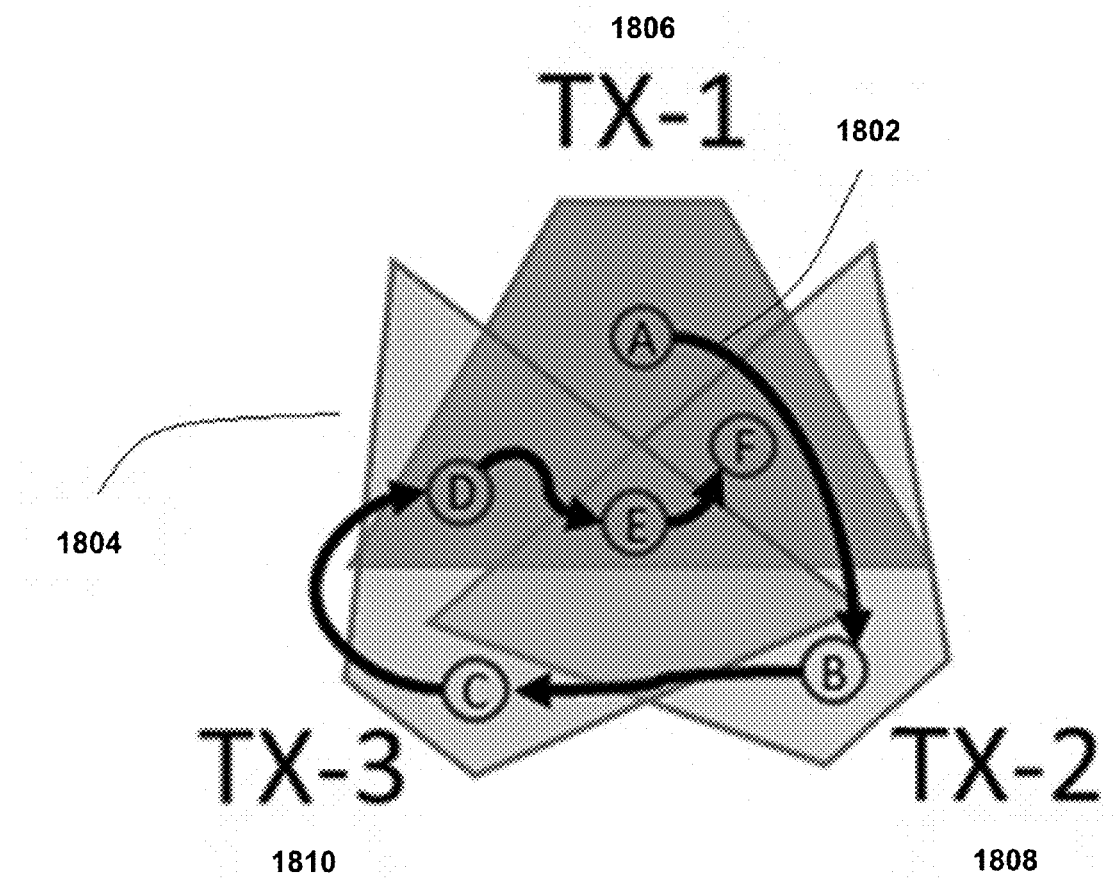
FIG. 18 is a schematic diagram of a wireless power receiver moving between several wireless power transmitters in a wireless power transmission system, according to an embodiment.

FIG. 18 shows the path 1802 of a user with mobile phone in hand, who enters and travels through a location 1804 including a cluster of transmitters TX1 1806, TX2 1808, and TX3 1810, As the device and receiver 1802 travel the path 1802 through nodes A→B→C→D→E→F, transmitters TX1 1806, TX2 1808, and TX3 1810 undergo the following transmitter communications transitions: (A) TX1 1806 detects the receiver and starts transmitting power; (B) The receiver moves out of range of TX1 1806 which ceases power transfer; TX2 1808 detects the receiver and starts transferring power; (C) The receiver moves out of range of TX2 1808 which ceases power transfer; TX3 1810 detects the receiver and starts transferring power; (D) The receiver remains within range of TX3 1810 which continues power transfer; TX1 1806 detects the receiver and re-starts transferring power; (E) The receiver remains within range of TX1 1806 and TX3 1810, which continue power transfer; TX2 1808 detects the receiver and re-starts transferring power, so that all three transmitters are transferring power; and (F) The receiver moves out of range of TX3 1810 which ceases power transfer; the receiver remains within range of TX1 1806 and TX2 1808, which continue power transfer.

When multiple wireless power transmitters are executing power transfers to a single receiver using BLE communications between transmitters and receiver, one or more wireless power transmitter managers embedded in the wireless power transmitters coordinate communications between the respective transmitters and the receiver. Bluetooth protocols only permit one communication connection at a time between the wireless power receiver and the multiple wireless power transmitters. Wireless power manager application software within the wireless power transmitter managers may carry out a routine, as a set of instructions and/or algorithm, for coordinating communication between communication managers of the multiple wireless power transmitters (wireless power transmitter cluster). This routine coordinates contemporaneous communications of the respective wireless power transmitters with the power receiver. As used in this description of cluster management of wireless power transmitters, contemporaneous means that at least two wireless power transmitters communicate with a power receiver during the same general period of time, but it does not mean that more than one wireless power transmitter communicate with the power receiver at exactly the same time. In an embodiment, the routine carried out by the wireless power manager application employs time division multiplexing (TDM) of contemporaneous communications between at least two wireless power transmitters and the power receiver.

In one embodiment involving a centralized control method, the wireless power management system selects one of the transmitters as a master transmitter. The master transmitter controls the order and timing of communications with the receiver among the plurality of transmitters that are executing power transfers to the receiver. Alternative methods for coordinating communications also are possible besides this centralized control method, such as methods involving decentralized control among the plurality of transmitters.

Figure 19:
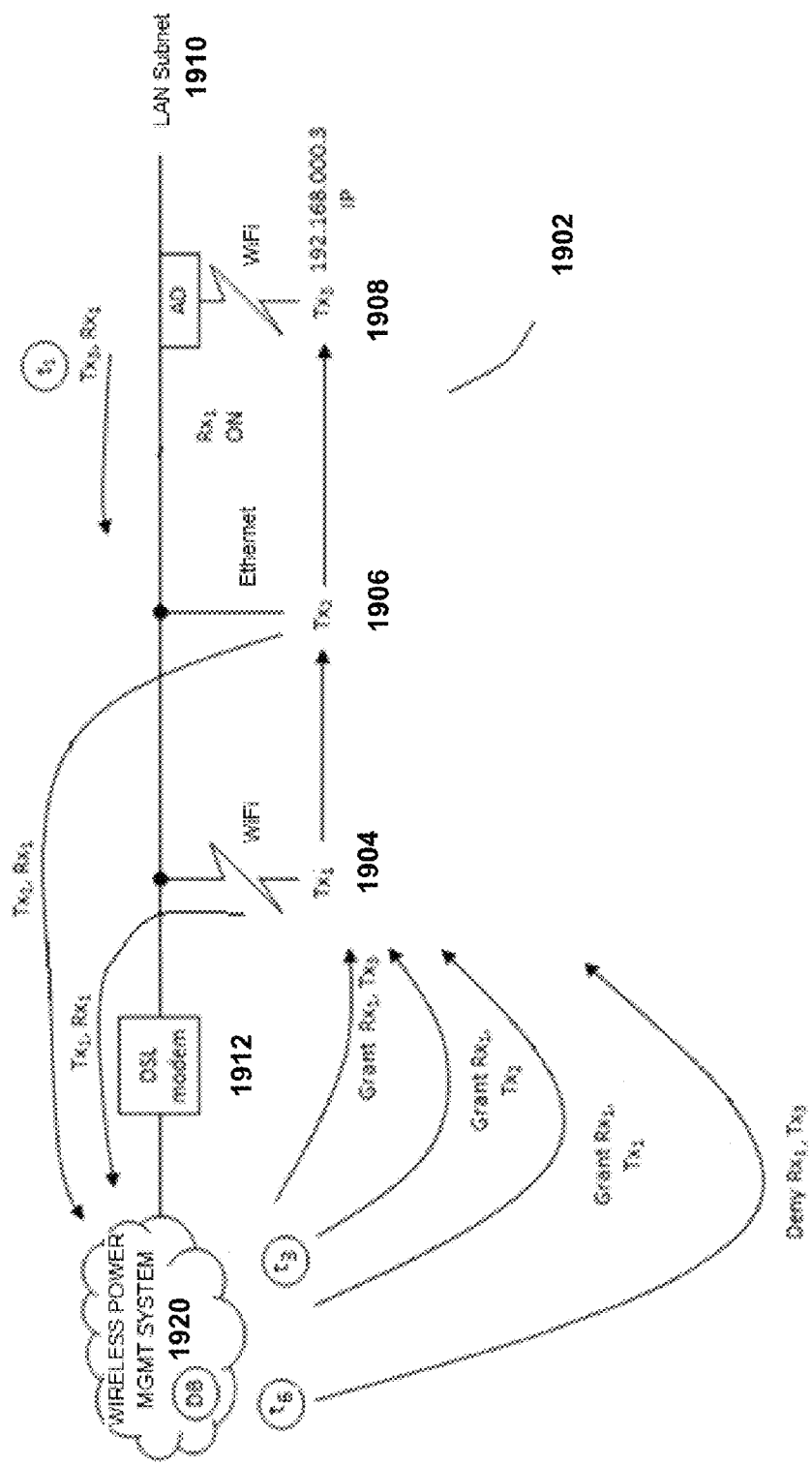
FIG. 19 illustrates a system architecture for a wireless power transmission system, and schematic diagram of communications of a cluster of wireless power transmitters, according to another embodiment.

In a system 1902 illustrated in FIG. 19, each of a plurality or cluster of transmitters TX1 1904, TX2 1906, TX3 1908 is connected with an enterprise bus 1910 such as Wi-Fi or Ethernet. When the system 1902 is installed, it is configured for network control, e.g. via a local area network subnet. Transmitters TX1 1904 and TX3 1908 are connected to LAN 1910 by Wi-Fi, and TX2 1906 is connected by Ethernet. An access point is included at 1912. Thus, the transmitters can exchange communications across a TCP/IP local area subnet, ensuring guaranteed communication using TCP sockets. This arrangement also allows the transmitters to broadcast information using an internet protocol such as the User Datagram Protocol (UDP), providing communications analogous to Bluetooth advertising.

When transmitters TX1 1904, TX2 1906, TX3 1908 power up, each of the transmitters begins regularly to broadcast across the network a message including its IP address and other information identifying the transmitter. Each transmitter in the network has access to broadcasts of the other transmitters, and each transmitter builds a list of all transmitters of the network, including identification of one of the transmitters as master transmitter. In a first embodiment of centralized control, the system identifies as master transmitter the transmitter with the lowest IP number, here shown as TX3 with IP address 192.168.000.3. Within the general approach of centralized control of transmitter-receiver communications by a master transmitter, other algorithms besides lowest IP number can be used to determine the master transmitter.

The system repeats this procedure regularly, so that if master transmitter TX3 went off line, the remaining transmitters would recalculate and assign one of the remaining transmitters as master. If the other transmitters did not see a UDP broadcast message from the master transmitter within a set period of time (e.g., 15 seconds), these remaining transmitters would recalculate the list of available transmitters and would assign one of the remaining transmitters as master based upon the applicable algorithm (in this embodiment, lowest IP number).

Figure 20:
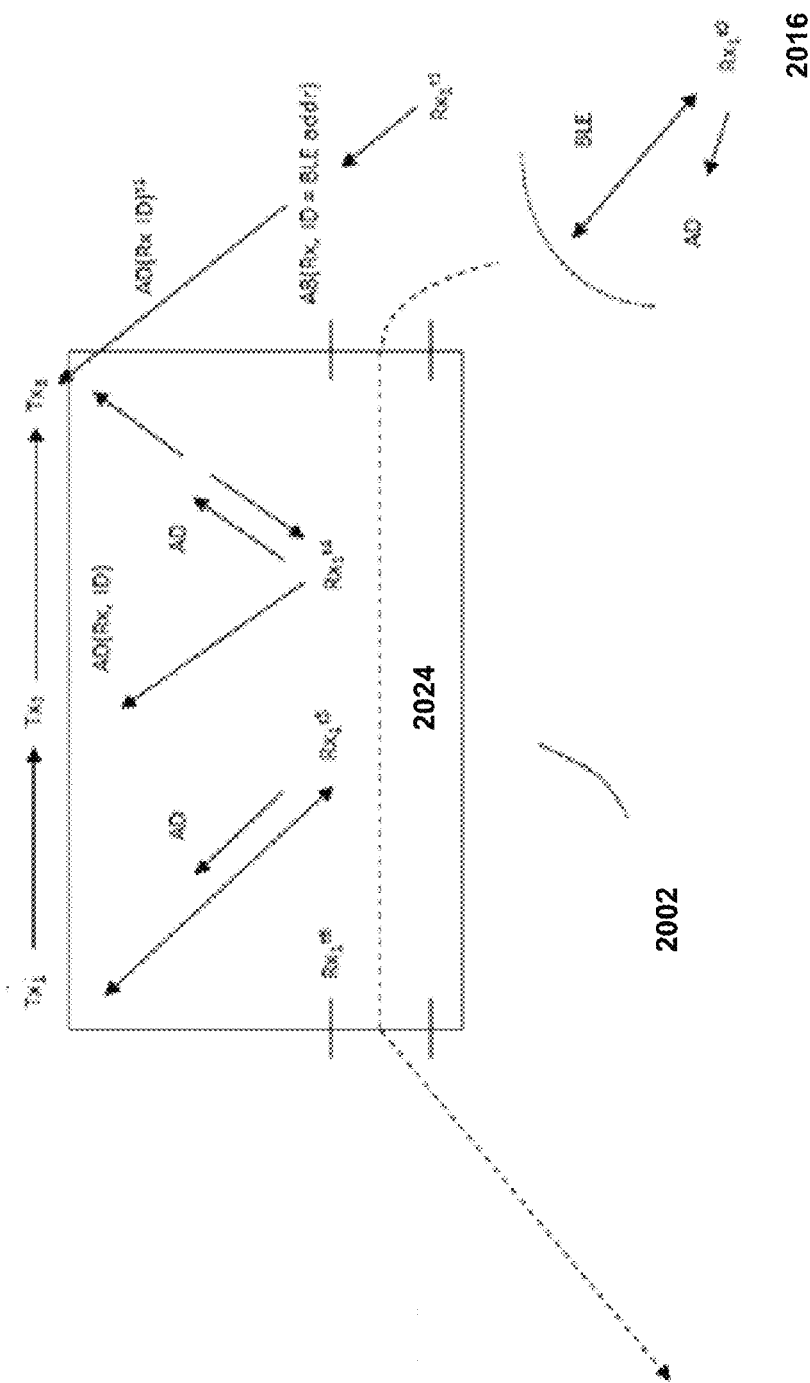
FIG. 20 is a schematic diagram of a wireless power receiver moving in proximity to the location of a cluster of wireless power transmitters in a wireless power transmission system, and a diagram of real time communications within the system, according to an embodiment.

Receiver RX1 1916 periodically broadcasts Bluetooth advertisements as the device with receiver approaches location 2024 (seen in FIG. 20). When transmitter TX3 1908 first detects a BLE advertisement from receiver RX1 1916 (step 1701 in the method of FIG. 17), it acquires the receiver's unique ID (Bluetooth address), and TX3 transmits this information to the management system 1920 via modem 1912 (both communications are shown schematically at time T1). Management system 1920 can reference information on the identified receiver; the local power management facility including all transmitters; information pertinent to authorization of the receiver (such as the enterprise or account associated with the receiver); pricing information; and other applicable information such as information on the transmitter TX3 that initiated the communication. In this embodiment, the management system 1920 determines that all transmitters in the cluster TX1, TX2 and TX3 are available for power transfers to receiver RX1 1916, and sends this message to the master transmitter (step 1703 in the method of FIG. 17).

FIGS. 19 and 20 schematically illustrate a method of transmitter cluster management at a location (e.g., room 2024). At time T3, management system 1920 sends the master transmitter a message granting receiver RX1 access to wireless power transmission by transmitters TX1 1904, TX2 1906, TX3 1908. After the initial authorization of transfer of power to receiver RX1 at time T3, in FIG. 20 receiver RX1 is shown entering and moving across room 2024 at various times T4, T5, and T6. At time T4, receiver RX1 is in range of transmitters TX2 and TX3. At time T5, receiver RX1 enters the range of transmitter TX1 and is in range of all three transmitters TX1, TX2 and TX3. When transmitter TX1 first detects receiver RX1, it sends a message to management system 1920, which sends the master transmitter TX3 a return communication granting transmitter TX1 power transfer to receiver RX1.

During a period following time T5, all three transmitters TX1, TX2, and TX3 are available to transfer power to receiver RX1, subject to coordination of communications of the three transmitters with receiver RX1 by the master transmitter TX3 (step 1705 in the method of FIG. 17). In one embodiment, master transmitter TX3 commands transmitters TX1 and TX2 to limit their communications with the receiver to one second of every period of three seconds (i.e. so that transmitters T1, T2 and T3 each is allotted one second from the three second period). This could be done for example by master transmitter TX3 sending one of the other transmitters an "on" signal at the beginning of the one second period for which communications are to occur for that other transmitter, and transmitter TX3 sending an "off" signal at the end of that period. Alternatively, master transmitter TX3 could send an "on" signal at the beginning of the "on" period for communications, coupled with the duration of that "on" period. During time periods in which a given transmitter is not communicating with receiver RX1, the transmitter will control the phase of its transmit antennas based upon the most recent communications obtained from the receiver. Given the high volume of communications transmitted by receiver RX1 during each one second "on" period, such intermittent time periods for communications have been observed to be sufficient to permit each transmitter to adjust its antenna phases to regulate power transfer (step 1707 in the method of FIG. 17), when transmitting power to a receiver in motion.

At time T6, receiver RX3 has left the range of transmitter TX3, while remaining within the range of transmitters TX1 and TX2. During the period in which a transmitter has been authorized to transmit power to an identified receiver, among other data the transmitter communicates to management system 1920, are data on the signal strength of its communications with the receiver, so that by time T6 management system 1920 detects that transmitter TX3 is out of range for receiver RX1 (step 1709 in the method of FIG. 17). Management system 1920 thereupon sends a deny access message for receiver RX1 to transmitter TX3, and selects one of the remaining transmitters (transmitter TX1, which has the lower IP number) as master transmitter. Thereafter, transmitter TX1 controls communications between receiver RX1 and the transmitters TX1 and TX2 that are still transferring power to receiver RX1.

In addition to tracking which transmitters are within range of a given receiver, the management system 1920 can limit the power output to given receivers and devices, e.g. based upon safety concerns. Various mobile phones have maximum DC power levels at or just under 4.0 watts (e.g., 3.96, 3.97, 3.98 or 3.99 watts). In the event of a transmitter cluster management transition, i.e. a change to the set of transmitters in communication with a given receiver, management system 1920 can send a message to the master transmitter to ensure compliance with any applicable maximum power level. This message would instruct available transmitters to limit power transfer from individual transmitters among the cluster of transmitters, thereby to ensure safe power transfers from each transmitter.

The foregoing discussion describes controlling cluster management of transmitters through the interaction of a cluster of transmitters with a wireless power management system, preferably a cloud computing management system with networked remote servers are networked for centralized data storage and online access to data management services. In an alternative embodiment, the cluster of transmitters achieves transmitter cluster management under the control of the transmitters themselves, without oversight by a wireless power management system. This is possible since the transmitters themselves can replicate most of the management information and functionality used by the wireless power management system in transmitter cluster management.

The transmitter cluster management scheme discussed above involves hierarchical management of all transmitters at given locations, sometimes herein called a transmitter cluster, in controlling power transfer by the transmitters to a receiver at that location. Other transmitter cluster management schemes are possible, which may manage transmitter-receiver connections at any level of a hierarchical structure. For example, the management system may define a given transmitter cluster as a subset of all transmitters at a location, and manage receiver interactions only with these transmitters separate from other transmitters at the location. Furthermore, the transmitter cluster management scheme may manage transmitter-receiver power transfers and communications across multiple, neighboring locations. For example, two neighboring households each may have two transmitters, which may be organized into one or two clusters managed by the cloud based power transfer management system. The system could manage neighboring locations as clusters, so all four transmitters would be part of one cluster; or, the system could manage each billing address as a separate cluster, so there would be two clusters each with two transmitters.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A system in a wireless power delivery network, comprising:
    a plurality of transmitter managers, each comprising a database storing records associated with a plurality of user devices; and
    a plurality of power transmitters communicatively coupled to (i) the plurality of transmitter managers and (ii) a power receiver coupled with a respective user device of the plurality of user devices;
    wherein at least one power transmitter of the plurality of power transmitters is configured to transmit signals received from the power receiver to at least two transmitter managers of the plurality of transmitter managers;
    wherein a respective transmitter manager of the at least two transmitter managers is configured to, based on (i) the signals received from the power receiver and (ii) the records stored in respective databases of the at least two transmitter managers, determine whether the respective transmitter manager has control over the respective user device; and
    in accordance with a determination that only one of the at least two transmitter managers has control over the respective user device, then the only one of the at least two transmitter managers is configured to instruct at least one of the plurality of power transmitters to transmit a plurality of power transmission signals that converge to generate a constructive interference pattern in proximity to the power receiver; and in accordance with a determination that the at least two transmitter managers of the plurality of transmitter managers have control over the respective user device, then each of the at least two transmitter managers is configured to instruct at least one of the plurality of power transmitters to transmit power transmission signals to the power receiver according to time division multiplexing (TDM) of communications between the power receiver and each of the at least two transmitter managers.

2. The system of claim 1, wherein the plurality of transmitter managers is configured to establish a network communication between the plurality of transmitter managers.

3. The system of claim 2, wherein each of the plurality of transmitter managers is further configured to share an associated database via the network communication.

4. The system of claim 2, wherein the network communication comprises at least one of a Wi-Fi communication, a local area network (LAN), a virtual private network (VPN), or a wireless area network (WAN).

5. The system of claim 1, wherein at least one of the plurality of transmitter managers is configured to create an area model comprising information about movement of at least one of the plurality of user devices.

6. The system of claim 1, wherein the power receiver is less than 30 feet away from the at least one power transmitter of the plurality of power transmitters.

7. The system of claim 1, wherein the records stored in the database comprise information related to at least one of charging history, charging schedules, charging status, or device IDs associated with the plurality of user devices.

8. The system of claim 1, wherein each one of the plurality of transmitter managers communicates with at least one of the plurality of user devices via a protocol selected form the group consisting of BLUETOOTH, Bluetooth Low Energy, Wi-Fi, NFC, ZIGBEE, and combinations thereof.

9. The system of claim 1, wherein each one of the plurality of transmitter managers further comprises an antenna manager for mapping a location of at least one of the plurality of user devices.

10. The system of claim 1, wherein each one of the plurality of transmitter managers is configured to communicably deliver to at least one remote server, information related to performance of the plurality of power transmitters or performance of the plurality of power receivers, or information related to at least one of the plurality of user devices.

11. A method in a wireless power delivery network, comprising:
transmitting, by at least one of a plurality of power transmitters, signals received from a power receiver coupled with a respective user device of a plurality of user devices to at least two transmitter managers of a plurality of transmitter managers;
determining, by a respective transmitter manager of the at least two transmitter managers, whether the respective transmitter manager has control over the respective user device based on (i) the signals received from the power receiver and (ii) records stored in respective databases of the at least two transmitter managers;
in accordance with a determination that only one of the at least two transmitter managers of the plurality of transmitter managers has control over the respective user device, instructing, by the only one of the at least two transmitter managers, at least one of the plurality of power transmitters to transmit a plurality of power transmission signals that converge to generate a constructive interference pattern in proximity to the power receiver;
in accordance with a determination that the at least two transmitter managers have control over the respective user device, instructing, by the at least two transmitter managers, at least one of the plurality of power transmitters to transmit power transmission signals to the power receiver in accordance with time division multiplexing (TDM) of communications between the power receiver and each of the at least two transmitter managers.

12. The method of claim 11, further comprising establishing a network communication between the plurality of transmitter managers.

13. The method of claim 12, wherein the network communication comprises at least one of a Wi-Fi communication, a local area network (LAN), a virtual private network (VPN), or a wireless area network (WAN).

14. The method of claim 12, further comprising configuring the plurality of transmitter managers to share their associated databases via the network communication.

15. The method of claim 11, further comprising configuring at least one of the plurality of transmitter managers to create an area model comprising information about movement of at least one of the plurality of user devices.

16. The method of claim 11, further comprising configuring each one of the plurality of transmitter managers to communicably deliver to at least one remote server, information related to performance of the plurality of power transmitters or performance of the plurality of power receivers, or information related to at least one of the plurality of user devices.

17. The method of claim 11, wherein the power receiver is less than 30 feet away from the at least one power transmitter of the plurality of power transmitters.

* * * * *